US012705824B2

(12) United States Patent
Liu et al.

(10) Patent No.: US 12,705,824 B2
(45) Date of Patent: Aug. 11, 2026

(54) METHODS AND SYSTEMS FOR GENERATING ENHANCED LIGHT TEXTURE DATA

(71) Applicants: Yang Liu, Toronto (CA); Keyi Liu, Markham (CA); Mohamed Ibrahim, Mississauga (CA); Sergei Sachkov, Oakville (CA)

(72) Inventors: Yang Liu, Toronto (CA); Keyi Liu, Markham (CA); Mohamed Ibrahim, Mississauga (CA); Sergei Sachkov, Oakville (CA)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 588 days.

(21) Appl. No.: 18/309,283

(22) Filed: Apr. 28, 2023

(65) Prior Publication Data

US 2024/0320903 A1 Sep. 26, 2024

Related U.S. Application Data

(63) Continuation-in-part of application No. 18/124,528, filed on Mar. 21, 2023, now abandoned.

(51) Int. Cl.

| | |
|---|---|
| ***G06T 15/50*** | (2011.01) |
| ***G06T 15/04*** | (2011.01) |
| ***G06T 15/06*** | (2011.01) |

(52) U.S. Cl.
CPC ............ *G06T 15/506* (2013.01); *G06T 15/04* (2013.01); *G06T 15/06* (2013.01)

(58) Field of Classification Search
CPC ........ G06T 15/506; G06T 15/04; G06T 15/06
See application file for complete search history.

(56) References Cited

U.S. PATENT DOCUMENTS

| | | | | |
|---|---|---|---|---|
| 8,803,880 | B2 * | 8/2014 | Zhou | G06T 15/506 345/589 |
| 2011/0238680 | A1 * | 9/2011 | Chhugani | G06T 17/005 707/E17.05 |
| 2015/0235410 | A1 * | 8/2015 | Ha | G06T 15/40 345/426 |
| 2018/0240266 | A1 * | 8/2018 | Chalk | G06T 15/80 |
| 2019/0340306 | A1 * | 11/2019 | Harrison | G06F 30/27 |
| 2020/0389582 | A1 * | 12/2020 | Herman | H04N 23/745 |

(Continued)

OTHER PUBLICATIONS

O'Donnell et al., Tiled Light Trees, DOI: http://dx.doi.org/10.1145/3023368.3023376, I3D '17, Feb. 25-27, 2017 (Year: 2017).*

(Continued)

*Primary Examiner* — Phuc N Doan

(57) ABSTRACT

System, method and media for processing a first light data structure that specifies, for each of plurality of directions for each of a plurality surface regions corresponding to a scene, respective light measurements, including: applying a trained artificial intelligence (AI) model to the first light texture data structure to generate an enhanced light data structure that specifies, for each of the plurality of directions for each of the plurality surface regions corresponding to the scene, respective enhanced light measurements; and storing an enhanced scene model that includes the enhanced light data structure together with geometric data that maps the enhanced light measurements.

20 Claims, 19 Drawing Sheets

(56) References Cited

U.S. PATENT DOCUMENTS

| | | | | |
|---|---|---|---|---|
| 2021/0141972 | A1* | 5/2021 | Aslandere | G06N 3/09 |
| 2022/0198722 | A1* | 6/2022 | Roy | G06T 11/00 |
| 2023/0281955 | A1* | 9/2023 | Ackerson | G06V 10/60 382/274 |

OTHER PUBLICATIONS

Lamecki et al., Hierarchical data structures in rendering scenes containing a massive number of light sources, DOI: 10.15439/2022F92, Proceedings of the of the 17th Conference on Computer Science and Intelligence Systems pp. 535-544 (Year: 2022).*

He, K., Zhang, X., Ren, S., & Sun, J. (2016). Deep Residual Learning for Image Recognition. IEEE Conference on Computer Vision and Pattern Recognition (CVPR), (pp. 770-778). Las Vegas, NV, USA.

Intel Open Image Denoise. (2018). Retrieved from https://www.openimagedenoise.org/.

Lim, B., Son, S., Kim, H., Nah, S., & Lee, K. (2017). Enhanced Deep Residual Networks for Single Image Super-Resolution. IEEE Conference on Computer Vision and Pattern Recognition (CVPR) Workshops.

Mildenhall, B., Srinivasan, P., Tancik, M., Barron, J., Ramamoorthi, R., & Ng, R. (2020). Representing Scenes as Neural Radiance Fields for View Synthesis. ECCV.

Ronneberger, O., Fischer, P., & Brox, T. (2015). U-Net: Convolutional Networks for Biomedical Image Segmentation. Medical Image Computing and Computer-Assisted Intervention.

* cited by examiner

```
Xatlas: PackOptions packOptions =xatalas: PackOptions ();
packOptions.bruteForce = True;
packOptions.texelsPerUnit = 0;
packOptions.resolution =512;
```

```
Int texStarIndx = m.images.size();
Tinygltf:: Image im;
Tinygltf:: Texture tex;

//set image properties
Im.width = texSize.x;
Im.height=texSize.y;
Im.component =4;
Im.bits=8;
```

FIG. 6

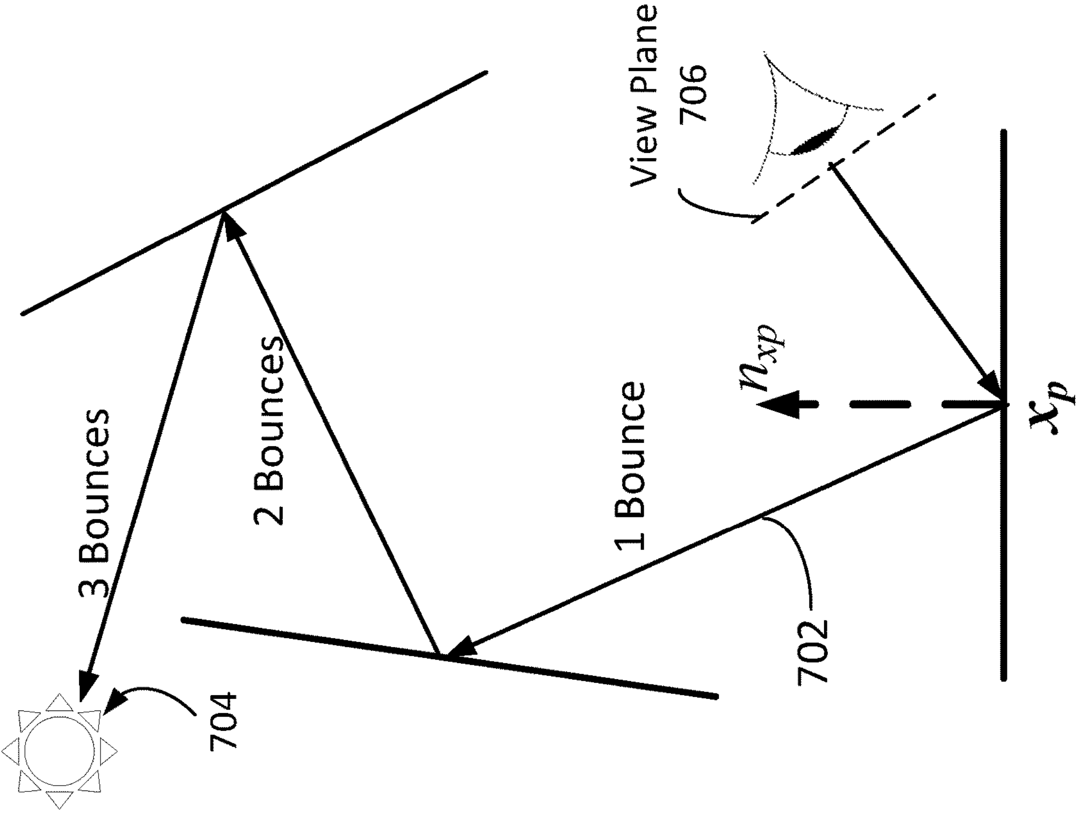
FIG. 7
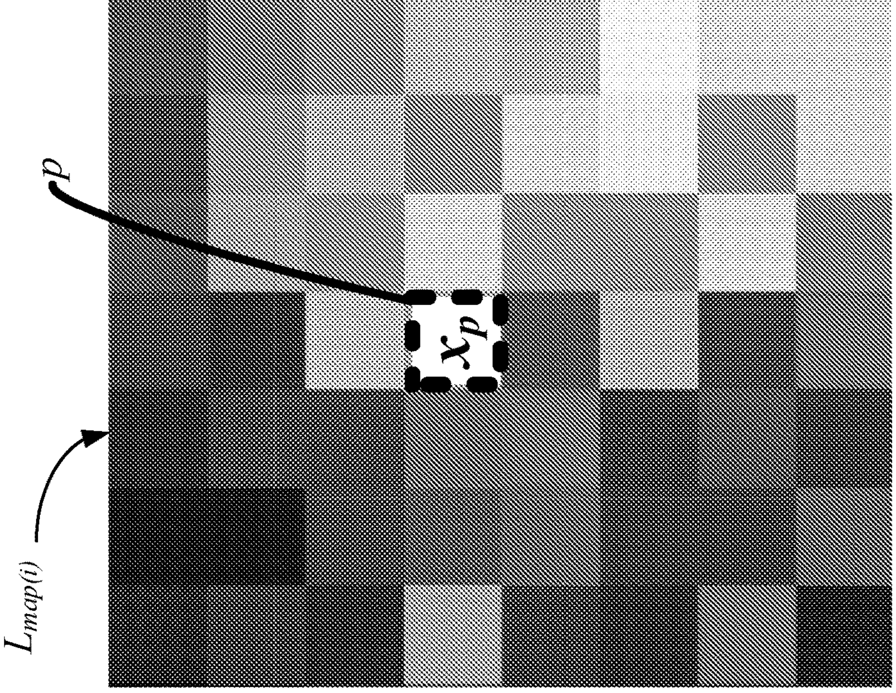

METHODS AND SYSTEMS FOR GENERATING ENHANCED LIGHT TEXTURE DATA

RELATED APPLICATIONS

This application is a continuation-in-part of U.S. patent application Ser. No. 18/124,528, filed Mar. 21, 2023, the contents of which are incorporated herein by reference.

TECHNICAL FIELD

The present disclosure generally relates to photo-realistic rendering of three-dimensional (3D) scenes, in particular, to methods and systems for generating enhanced light texture data for use in rendering photo-realistic 3D scenes.

BACKGROUND

Physically based rendering (PBR) is used to generate realistic color renderings of three-dimensional (3D) scenes, which are in high demand for the entertainment industry, and in particular the gaming industry. These techniques mimic physical interactions of light rays with objects in 3D scenes to produce plausible, high-quality, physically accurate renderings. With the development of high quality and photo-realistic 3D rendering techniques, many applications have been inspired, including virtual and augmented reality, video games, and etc.

PBR techniques simulate the process of light transport and the interaction of light rays with objects, and thus successfully produce lifelike effects such as global illumination and depth of field. Although the efficiency of PBR has been improved by Path Tracing (PT) algorithms, PBR techniques are computationally intensive and rendering high quality images of 3D scenes, particularly in an interactive environment of changing viewing perspectives, is a highly challenging and computationally demanding task. The rendering task can be particularly difficult for computationally constrained devices such as mobile devices that have limited processing power and storage capacity and are powered by a limited energy battery.

Accordingly, there is a need for methods and systems that can enable realistic rendering of 3D scenes in a quick and efficient manner using computationally constrained devices such as mobile devices.

SUMMARY

According to a first example aspect, a computer implemented method is disclosed for processing a first light data structure that includes light texture data that specifies, for each of plurality of directions for each of a plurality surface regions corresponding to a scene, respective light measurements. The method includes applying a trained artificial intelligence (AI) model to the first light data structure to generate an enhanced light data structure that specifies, for each of the plurality of directions for each of the plurality surface regions corresponding to the scene, respective enhanced light measurements; and storing an enhanced scene model that includes the enhanced light data structure together with geometric data that maps the enhanced light measurements within the enhanced light data structure to the plurality surface regions.

In some example aspects, the first light texture data structure includes visibility probability data that specifies, for each of the plurality surface regions corresponding to the scene, respective visibility probability values from light sources.

According one or more of the preceding example aspects, the first light data structure includes, for each of the plurality of directions, a respective direction specific first light texture map specifying the respective light measurements for the plurality of surface regions for the direction; the visibility probability data is arranged as a visibility map having the same resolution as the first light texture maps; and the enhanced light texture data structure comprises, for each of the plurality of directions, a respective direction specific enhanced light texture map specifying the respective enhanced light measurements for the plurality of surface regions for the direction.

According one or more of the preceding example aspects the direction specific first light texture maps, the visibility map and the direction specific enhanced light texture maps are each formatted as respective two dimensional image files, and the geometric data maps respective pixel locations within the two dimensional image files to respective surface regions of the plurality of surface regions.

According one or more of the preceding example aspects the AI model comprises at least one of a convolutional autoencoder, a vision transformer, or a recurrent neural network.

According one or more of the preceding example aspects the AI model comprises at least one or more of: a denoiser, a super-sampler; or an anti-aliasing model.

According one or more of the preceding example aspects, the first light data structure comprises a respective surface region light texture tensor for each of the respective surface regions, each surface region light texture tensor specifying the respective light measurements for the surface region for the plurality of directions; and the enhanced light texture data structure comprises a respective enhanced surface region light texture tensor for each of the respective surface regions, each enhanced surface light texture region tensor specifying the respective enhanced light measurements for the surface region for the plurality of directions.

According one or more of the preceding example aspects, the respective light measurements each represent a gathered RGB color value light color measurement.

According one or more of the preceding example aspects, the enhanced scene model conforms to a graphics language transmission format (glTF).

According one or more of the preceding example aspects for each of the plurality of directions for each of the plurality surface regions, the light measurements represent light data for a respective range of light directions that intersect the surface region.

According one or more of the preceding example aspects, the method includes: defining, for each of the plurality of surface regions, a respective local reference frame and a bin structure, the bin structure discretizing the local reference frame into a set of bins, each bin corresponding to a respective range of light directions that intersect the surface region; computing, for each surface region, a respective color measurement for each bin of the bin structure, the respective color measurement for each bin being based on a path trace of one or more light ray samples that fall within the respective range of light directions corresponding to the bin, wherein the respective color measurements are used as the respective light measurements; assembling the first light data structure that indicates the respective local reference frames, bin structures, and respective light measurements for the surface regions; and storing the first light data structure.

According one or more of the preceding example aspects, the method includes sending the enhanced scene model through a network to a remote rendering device.

According one or more of the preceding example aspects, the method includes repeatedly performing the applying, storing and sending in order to support real-time rendering of series of scenes at the rendering device wherein the applying, storying, and sending are performed at a cloud computing platform that is more computationally powerful than the rendering device.

According one or more of the preceding example aspects, the method includes, at the rendering device: obtaining the enhanced scene model; rendering a scene image for the scene model based on an input view direction, wherein pixel colors in the rendered scene image are determined based on the light measurements included in the enhanced scene model.

In some example aspects, the present disclosure describes a system comprising one or more processors and one or more non-transitory memories that store executable instructions for the one or more processors, wherein the executable instructions, when executed by the one or more processors, configure the system to perform the method of any one of the preceding example aspects.

In some example aspects, the present disclosure describes a computer readable medium storing computer executable instructions that when executed by one or more processors of a computer system, configure the computer system to perform the method of any one of the above example aspects.

In some example aspects, the present disclosure describes computer program that when executed by one or more processors of a computer system, configure the computer system to perform the method of any one of any one of the above example aspects.

BRIEF DESCRIPTION OF THE DRAWINGS

Reference will now be made, by way of example, to the accompanying drawings which show example embodiments of the present disclosure, and in which:

FIG. 5 illustrates selected parameter definitions for an 'Xatlas' library that can be used by the server of FIG. 2;

FIG. 6 represents a coded example of defining a 'tinyGLTF' image that is used by the example server of FIG. 1;

FIG. 7 shows a simulated illumination of a point cluster $x_p$ by a light source.

Similar reference numerals may be used in different figures to denote similar components.

DETAILED DESCRIPTION

The following describes example technical solutions of this disclosure with reference to accompanying drawings.

One solution to enable high quality PBR tasks to be performed at computationally constrained device such as mobile devices is to configure a server-client system that offloads costly view independent PBR computations from a client device to a computationally capable server and leaves the client device with as few, view dependent computations, as possible. In such a system, view independent computations are pre-computed (e.g., offline) at a server by path tracing algorithms offline to provide light texture data that can be requested by multiple client devices simultaneously in real-time. This can enable lifelike 3D rendering experiences by client devices such as computationally constrained device mobile devices.

Explosive growth in the number of mobile devices has out-numbered computationally capable servers, which poses challenges on existing servers to be able to handle expanding crowds of client devices and burst multiple tasks in real-time. Quality of the pre-computed view independent light texture data information may be compromised by artifacts (e.g. noise, aliasing, etc.) or by lower native resolutions, and these artifacts may present on a client device as well.

According to example implementations, systems and methods are disclosed to produce pre-computed light texture data using Artificial Intelligence (AI) techniques. In example embodiments, an AI model that can, for example, be implemented at a server device takes lower-quality light texture data as input, and enhances the light texture data (e.g., noise removal, sharper details recovery, and anti-aliasing, among other possible enhancements) in a computationally efficient manner. The enhanced light texture data includes high-quality light information that can then be provided to client devices.

In this disclosure, "AI model" can refer to a computer implemented machine learning algorithm, performed by a processor-enabled device, that can learn and apply a set of parameters to emulate a logical decision-making task. A trained AI model (also referred to as a pre-trained AI model) includes both the algorithm and a set of learned parameters.

Figure 1:
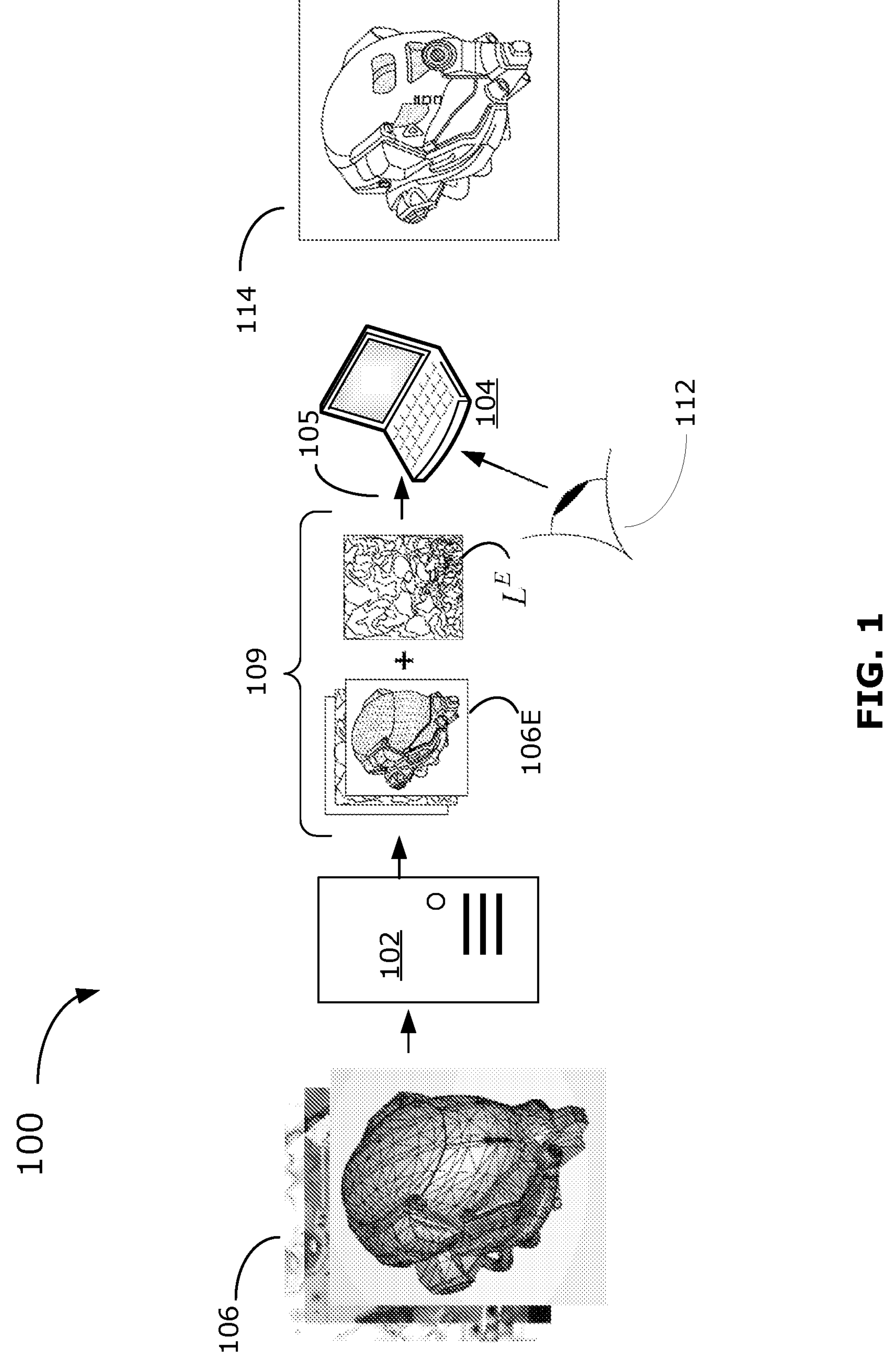
FIG. 1 is a schematic diagram of a system that can be used for physically based rendering (PBR) in accordance with example aspects of the present disclosure.

FIG. 1 illustrates a schematic diagram of a rendering system 100, including a first computer system (e.g., server 102) and a second computer system (e.g., client device 104), to render a realistic image of a 3D scene, in accordance with example aspects of the disclosure. As shown in FIG. 1, the server 102 receives 3D scene model 106 as input.

In this disclosure, "scene model" can refer to a set of data structures that collectively encode data that define a geometry and appearance of content represented in a scene space. The scene space may correspond to one or more of a real-world scene, a virtual scene, and an augmented reality scene. The scene model can be used by a rendering process to generate one or more visual representations of the scene space.

As will be explained in greater detail below, server 102 processes the input 3D scene model 106 using one or more computationally intensive algorithms to generate an enhanced 3D scene model 109 that includes edited 3D scene model 106E with an appended enhanced light texture component $L^E$. As explained in greater detail below, in example embodiments, enhanced light texture component $L^E$ includes set of enhanced light texture maps $\{L^E_{map(1)}, \ldots, L^E_{map(BI)}\}$ (also referred to as bin images). The enhanced 3D scene model 109 can also include corresponding albedo and surface normal maps. The client device 104 receives, as inputs, the enhanced 3D scene model 108 and a view direction 112. Client device 104 renders a scene image 114 representation of a 3D scene from the enhanced 3D scene model 109 that corresponds to the view direction 112. Additional images can be rendered using the enhanced 3D scene model 109 for additional view directions 112, enabling an interactive user experience at client device 104. As will be explained in greater detail below, the data that has been added to enhanced 3D scene model 109 through computationally intensive algorithms at the server 102 can enable the client device 104 to render scene images 114 for different view directions 112 in a computationally and time efficient manner.

In the example of FIG. 1, the server 102 is a computationally capable system that provides resources, data, services, or programs to other devices, such as one or more client devices 104, over a digital communications network 105 that may include one or both of wired and wireless networks. The client device 104 can be any device that is able to realistically render images of 3D scenes with colors. The client device 104 may include a laptop, a desktop personal computer (PC), tablet, mobile station (MS), mobile terminal, smartphone, mobile telephone, or other display enabled mobile device.

Figure 2A:
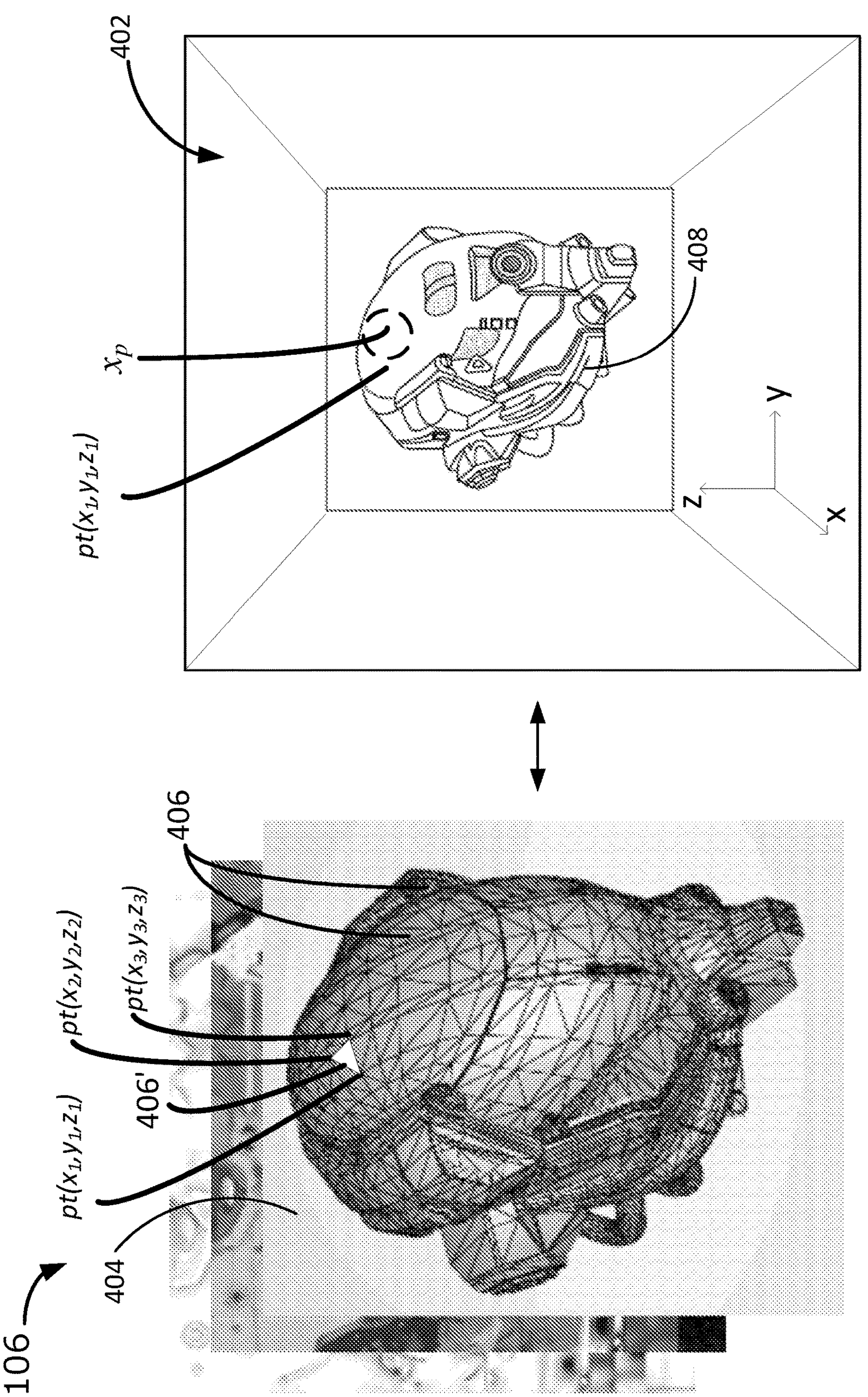
FIG. 2A schematically illustrates an example of a 3D scene model and corresponding 3D scene space.

With reference to FIG. 2A, in an example embodiment, the input 3D scene model 106 describes a 3D scene space 402. Input 3D scene model 106 is a set of data structures that collectively encode data that defines a geometry and appearance of content represented in the 3D scene space 402. Locations (also referred to as points "pt") within the 3D scene space can be defined by a set of point coordinates that reference a three dimensional spatial coordinate system, for example an orthogonal X,Y,Z coordinate system. The geometry of objects within the 3D scene space are represented as a collection of basic geometric units, referred to as primitives 406. A primitive 406 can, for example, be a point, a line, or a polygon such as a triangle. A primitive 406 can define a face area of a geometric object 408 that is included in a scene. The geometry of each primitive is defined by one or more points, with each point having a respective set of (x,y,z) coordinates. In the case of a simple polygon shaped primitive, the geometry of the primitive can be defined by the set of points that form the vertices of the polygon. For example, the three points $pt(x_1,y_1,Z_1)$, $pt(x_2,y_2,Z_2)$ and $pt(x_3,y_3,Z_3)$ can define a respective triangle primitive 406.

Primitives 406 can share common points and edges. Each primitive 406 can have an associated material that indicates visual appearance properties of the primitive, including for example texture properties for a surface of the primitive.

In an illustrative example, 3D scene model 106 conforms to the graphic label transmission format (gITF™) as maintained by The Khronos Group. The gITF specifies a data format for the efficient transmission and loading of 3D scenes by computer applications. In example embodiments, the input 3D scene model 106 (also known as a gITF asset) is represented by a set of files, including: (i) a JavaScript Object Notation (JSON) file (e.g., .gtlf file) containing a full scene description: node hierarchy, materials, cameras, as well as descriptor information for meshes, animations, and other constructs; (ii) Binary files (e.g., .bin file) containing binary resources that can include geometry, animation, and other buffer-based data; and (iii) Image files (e.g., jpg, .png files) containing image resources such as texture maps. In some examples, binary and image resources may be embedded in the .gtlf file.

Figure 2B:
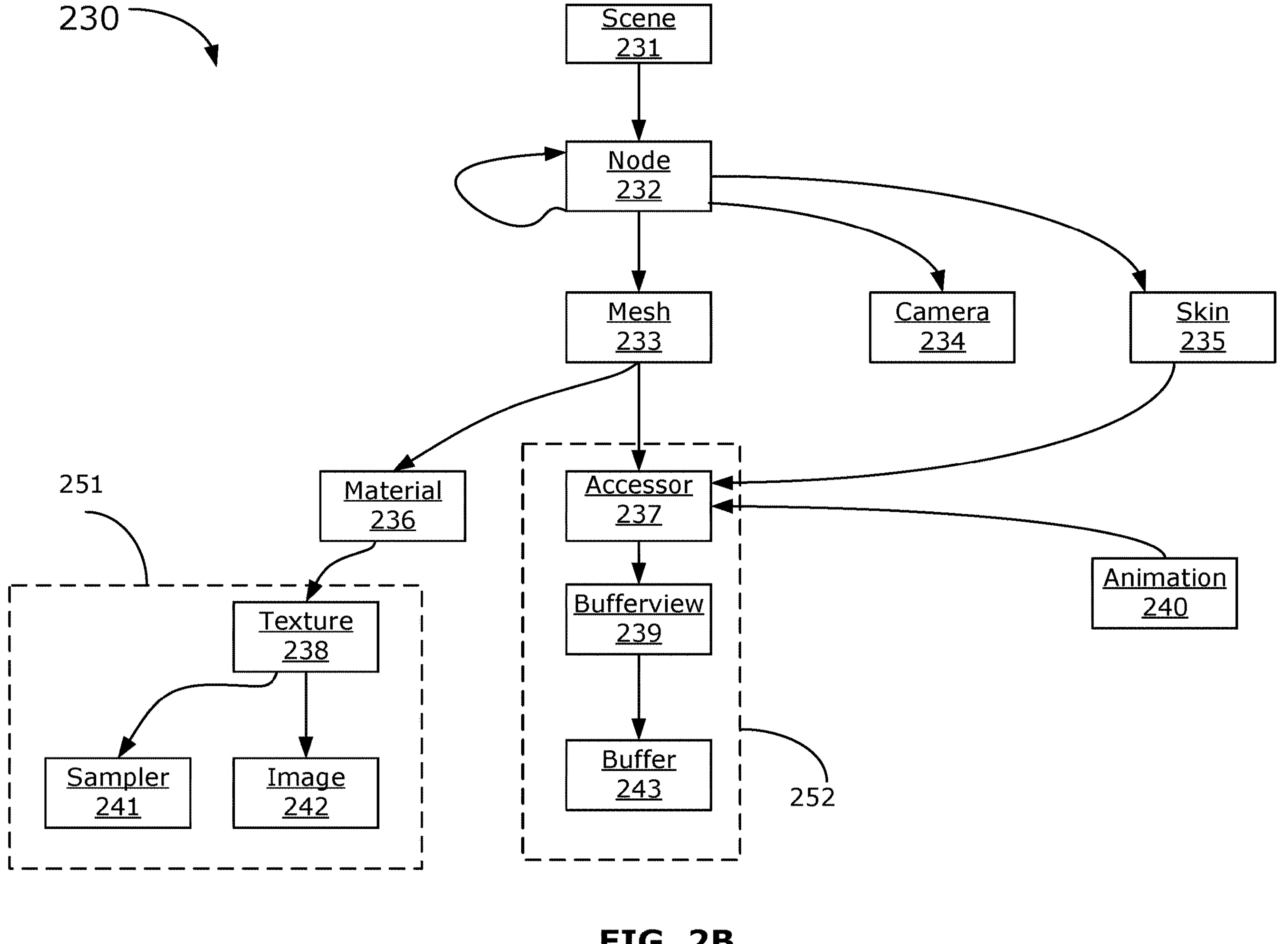
FIG. 2B is a high level representation of a graphics language transmission format (gITF) that can be used for a 3D scene model.

To provide context, FIG. 2B is a block diagram overview of the top-level components of a JSON file 230 for a gITF based 3D scene model 106. The JSON file 230 includes a description of the scene structure itself, which is given by a hierarchy of node components 232 that define a scene graph. Scene content (for example one or geometric scene objects) is defined using mesh components 233 that are attached to the node components 232. Material components 236 (together with the components that they reference) define the appearance of scene content to be rendered, including the surface material of such content. Animation components 240 describe how scene content is transformed (e.g., rotated or translated) over time, and skin components 235 define how the geometry of the scene content is deformed based on a skeleton pose. Camera components 234 describe the view configuration for a scene.

The mesh components 233 are stored in arrays in the JSON file and can be accessed using the index of the respective component in the array. These indices are also used to define the relationships between the components.

In the overview of FIG. 2B, a scene component 231 is an entry point for a description of a scene that is represented by 3D scene model 106. Scene component 231 refers to one or more node components 232 that collectively define the screen graph. A node component 232 corresponds to a respective node in the screen graph hierarchy. A node component 232 can contain a transformation (e.g., rotation or translation), and it may refer to further (child) nodes. Additionally, it may refer to mesh components 233 or camera components 234 that are attached to the node component 232, or to a skin component 235 that describes a mesh deformation.

A mesh component 233 can describe a geometry and appearance of scene content, including a structure of one or more objects that appear in the scene, and can refer to one or more accessor components 237 and material components 236. An accessor component 273 is used for accessing the actual geometry data for the scene content, and functions as an abstract source of arbitrary data. It is used by the mesh component 233, skin component 235, and animation component 240, and provides geometry data, skinning parameters and time-dependent animation values required to render a scene image. Accessor component 273 refers to one or more bufferView components 239, which refers to one or more buffers 243. A buffer 243 contains actual raw binary data for the geometry of 3D objects, animations, and skinning. The bufferview component 239 add structural information to the data contained in the buffer 243. In the example of FIG. 2B, accessor components 237, bufferview components 239, and buffers 243, (hereafter referred to collectively as geometry data 252) cooperatively define data references and data layout descriptions that provide the geometry of the scene content that is represented by mesh component 233.

A material component 236 contains parameters that define the appearance of the scene content being rendered. It can refer to texture components 238 that define surface appearances of scene objects. Each texture component 238 is defined by a sampler component 241 and an image component 242. The sampler component 241 defines how a texture map that is specified in image component 242 should be placed on a surface of scene content when the content is rendered. The texture components 238, sampler components and image components 242, (hereafter referred to collectively as appearance data 251) cooperatively describe the surface appearance of the scene content that is the subject of mesh component 233.

In the input 3D scene model 106, primitives 406 that are defined in a mesh 404 will typically be mapped to respective appearance data (e.g., color and texture data that is present in the input 3D scene model 106).

Referring again to FIG. 2A, a mesh 404 is shown that is a collection of primitives 406 within a 3D scene.

Figure 3:
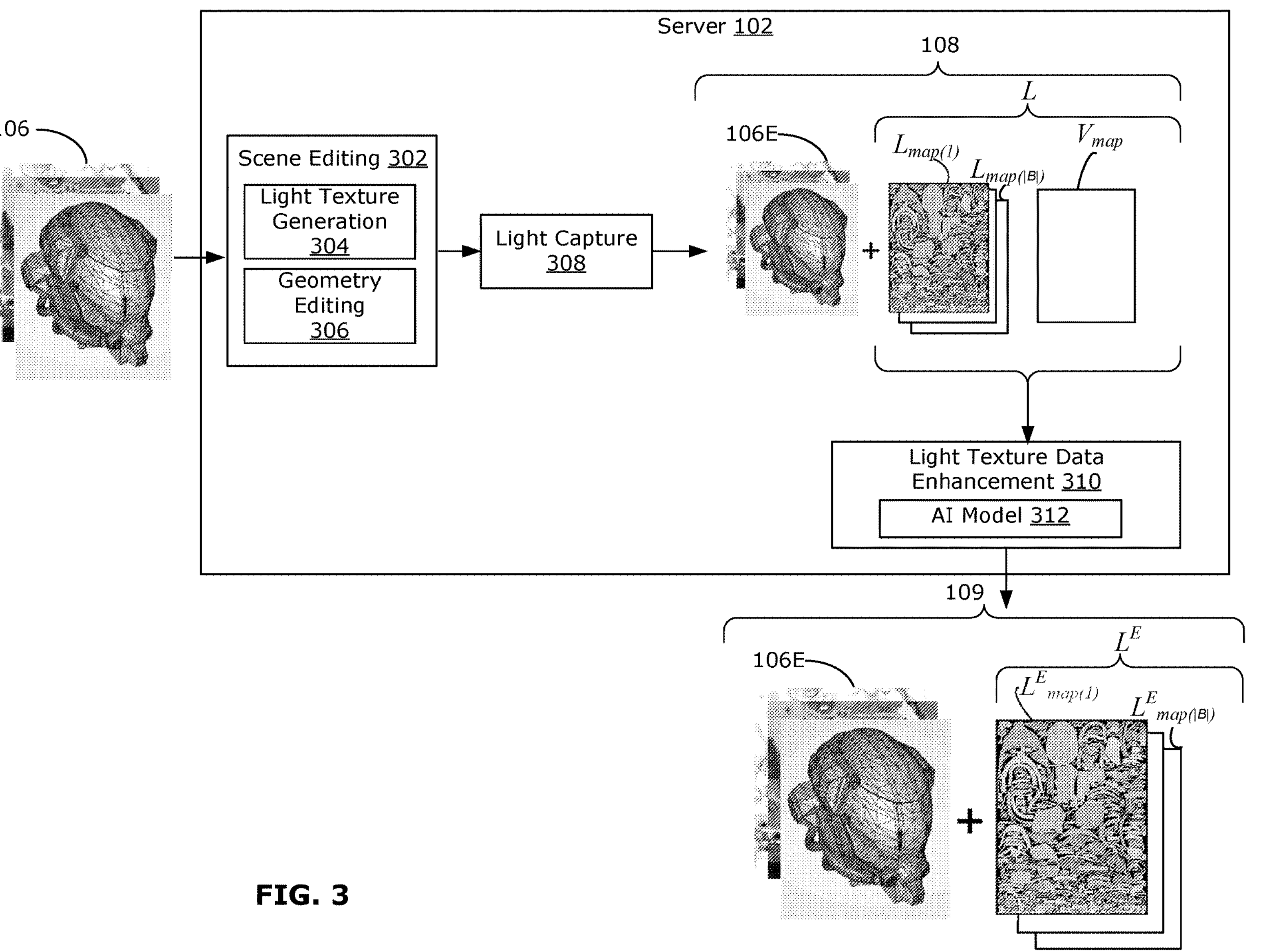
FIG. 3 is a block diagram illustrating example of operations performed by a server of the system of FIG. 1 to generate an enhanced 3D scene model.

Referring to FIG. 3, processing of an input 3D scene model 106 by server 102 to generate a respective enhanced 3D scene model 109 will now be described in greater detail. In the illustrated example, server 102 is configured to perform a scene editing operation 302 and a light capture operation 308 to generate an intermediate 3D scene model 108, which is then processed by a light texture data enhancement operation 310 to generate enhanced 3D scene model 109. In the illustrated example, input 3D scene model 106 is loaded by the server 102 using the 'tinyglTF' loader/saver available in the GITUB 'tinyglTF' C++ library (Reference 1: S. Fjuita, "Header only C++ tiny glTF library(loader/saver).," [Online]. Available: https://github.com/syoyo/tinygltf. [Accessed Feb. 26, 2022].)

Figure 4:
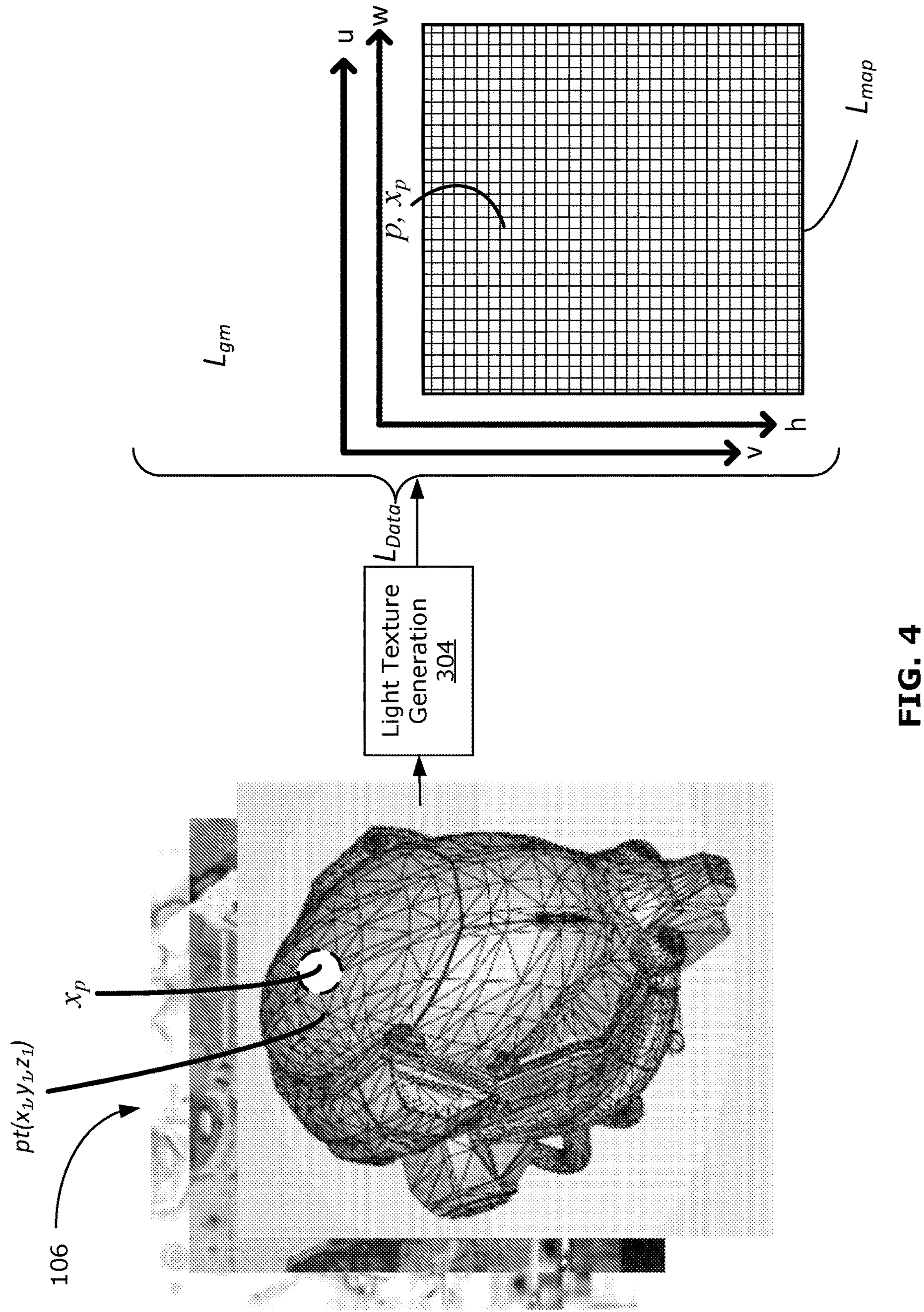
FIG. 4 is a schematic representation of actions performed by a scene editing operation of the server of FIG. 2.

Scene editing operation 302 includes, as sub-operations, a light texture generation operation 304 and a geometry editing operation 306. Referring to FIG. 4, light texture generation operation 304 is configured to generate a set of light texture data $L_{data}$ for the scene content represented in 3D scene model 106. Light texture data $L_{data}$ is a collection of geometric data $L_{gm}$ that corresponds to a blank 2D light texture map $L_{Map}$. The 2D light texture map $L_{Map}$ can be a 2D array of pixels, with each pixel $p \in P$ indexed by a respective pair of w,h coordinates, where p denotes a single pixel within the set of pixels P that make up the 2D light texture map $L_{Map}$. In an example embodiment, light texture map $L_{Map}$ can have a size that is set by a defined parameter, for example $w_{max}$=512 by $h_{max}$=512 pixels. Geometric data Lom can include coordinate mapping data that maps vertex points pt and surface regions (also referred to as point clusters $x_p$) within the 3D scene space of the 3D scene model 106 to respective locations in the light texture map $L_{Map}$.

In example embodiments, one function of light texture generation operation 304 is to identify clusters of points $pt(n_1), \ldots, pt(n_p)$ that are close to each other in the 3D scene space 402 and group the identified close points into respective point clusters $x_p$. Each point cluster $x_p$ can correspond to a respective surface region that will be assigned a set of captured gathered light data as described below. Closeness can be a function of geometrical distance. Each point cluster $x_p$ is then mapped to a respective pixel p (i.e., a unique integer w,h coordinate pair) in the light texture map $L_{Map}$. The number of points pt included per point cluster $x_p$ can be determined based on the volume and density of the 3D scene space 402. In some examples, the points pt that correspond to multiple primitives 406 (for example adjacent triangle primitives 406 that share an edge or vertex.) may be included in a single point cluster $x_p$. In some examples, only the points pt that correspond to a single primitive 406 may be included in a single point cluster $x_p$. In some examples, the points pt included in a single point cluster $x_p$ may include only a subset of the points that make up a primitive 406.

In addition to having locations that correspond to pixels indexed according to w,h integer coordinate frame, locations in light texture map $L_{Map}$ can also be referenced by a continuous u,v coordinate frame. The u,v coordinate frame can overlay the w,h coordinate frame, and the respective frames can be scaled to each other based on the volume of the 3D scene space 402 represented in the 3D scene model 106. Multiple u,v coordinate values can fall within a single pixel p. A further function of light texture generation operation 304 is to map each unique point pt in 3D scene space 402 that defines a primitive (e.g., each vertex point) to a respective, unique u,v coordinate of light texture map $L_{Map}$.

Accordingly, light texture generation operation 304 generates geometric data $L_{gm}$ that includes coordinate data that maps locations in the 3D scene space 402 to locations in the 2D light texture map $L_{Map}$. This coordinate mapping data can include point pt to unique u,v coordinate frame mapping. The coordinate mapping data can also include explicit or implicit indications of: multiple point pt to point cluster $x_p$ mapping and point cluster $x_p$ to unique pixel p mapping. In an example, these mapping functions are performed using an application such as the Xatlas function. Xatlas is available as a C++ library available on Github (Reference 2: J. Young, "xatlas," [Online]. Available: https://github.com/jpcy/xatlas. https://github.com/syoyo/tinygltf. [Accessed Feb. 26, 2022]). Xatlas processes the 3D scene model 106 to parametrizes a mesh that represents the contents of 3D scene space. The parametrized mesh is cut and projected onto a 2D texture map (also referred to as an image) such that every vertex point pt within the mesh is assigned a unique u,v entry in the light texture map $L_{map}$ and close points are grouped together into respective point clusters $x_p$ (that each correspond to a respective pixel p).

FIG. 5 presents an example of selected Xatlas parameters 220 that can be defined to enable the Xatlas function to generate geometric data $L_{gm}$ for a light texture map $L_{Map}$ corresponding to 3D scene model space 106. A first parameter 222, 'packOptions.bruteForce', determines quality of the 2D projection that corresponds to light texture map $L_{Map}$. In an example where both a best projection quality and small size of the 2D light texture map $L_{Map}$ are desired, the first parameter 222 is set to be true. A second parameter 224, 'packOptions.texelsPerUnit', is used to control unit to texel (i.e. pixel) scale. The second parameter 224 can be set to 0 in example embodiments, causing the Xatlas function to estimate and use a scale that matches a resolution that is determined by a third parameter 226, 'packOptions.resolution'. In this example, the third parameter 226 can be set to 512 such that pixel resolution of the 2D light texture map $L_{Map}$ is set to be close to a 512×512 image.

The output of light texture generation operation 304 is a set of geometric data $L_{gm}$ corresponding to the blank light texture map $L_{Map}$. The geometric data $L_{gm}$ includes sets of coordinates that define the corresponding point pt to unique u,v coordinate frame mappings, geometric data $L_{gm}$ can also define multiple point pt to point cluster $x_p$ mappings, and point cluster $x_p$ to unique pixel p mappings. The geometric data Lom may include new vertices and faces beyond those defined in the original 3D Scene model 106. These new vertices and faces are added by the Xatlas function to ensure a unique u, v coordinate entry per point pt into the blank light texture map $L_{map}$.

Referring again to FIG. 3, geometry editing operation 306 is configured to add the geometric data $L_{gm}$ and references to the blank light texture map $L_{Map}$ into the gITF file (e.g., a JSON file) for the gITF 3D scene model 106, and generate a set $\{L_{Map(1)}, \ldots, L_{Map(BI)}\}$ of blank versions of light texture map $L_{Map}$ for inclusion in the image files that are part of gITF 3D scene model 106.

In this regard, the scene appearance data 251 (i.e., texture component 238, sampler component 241 and image component 242) of gITF 3D scene model 106 is updated to add references to the blank light texture map $L_{Map}$ to the scene appearance data 251. The scene geometry data 252 of gITF 3D scene model 106 is edited to add the newly generated geometric data $L_{gm}$. In particular, the buffer 243, bufferView component 239 and accessor component 237 are updated.

An example of the generation of the blank version of light texture map $L_{Map}$ is illustrated in the process 260 illustrated by code in FIG. 6. In the illustrated example, light texture map $L_{Map}$ is set to have a width ($x=w_{max}$) and height ($y=h_{max}$), the number of components per pixel is set to 4, and the bits for each component is set to 8.

In example embodiments, blank light texture map $L_{map}$ is replicated to generate multiple light texture maps $\{L_{map(1)}, \ldots, L_{map(|B|)}\}$ that are appended to the image files that are included in the gITF 3D scene model 106. As will be explained in greater detail below, each of the respective light texture maps $L_{map(i)}$ (where i indicates a value between 1 and |B|) corresponds to a respective "bin" b and is used to store light texture information pertaining to a respective range of light directions.

In example embodiments, the same point cluster to pixel mapping that used for blank version of light texture map $L_{Map}$ can also be used to generate a blank version of a visibility map $V_{map}$. Blank visibility map $V_{map}$ is also appended to the image files that are included in the gITF 3D scene model 106. As will be explained in greater detail below, visibility map $V_{map}$ is used to store visibility information for the respective point clusters relative to the light sources that illuminate the scene. The set of light texture maps $\{L_{map(1)}, \ldots, L_{map(|B|)}\}$ and corresponding visibility map $V_{map}$ collectively provide light texture component L of intermediate 3D scene model 108.

At the conclusion of light texture generation operation 304 and geometry editing operation 306, the edited gITF 3D scene model 106E, including an appended set of blank light texture maps $\{L_{map(1)}, \ldots, L_{map(|B|)}\}$ and visibility map $V_{map}$ can be saved. In some examples, the 3D scene model that is input to server 102 can be pre-edited to include light texture data $L_{data}$, in which case scene editing operation 302 can be skipped.

Light capture operation 308 receives the edited gITF 3D scene model 106E (including the added geometric data $L_{gm}$ and set of blank 2D light texture maps $\{L_{map(1)}, \ldots, L_{map(|B|)}\}$) as input and is configured to populate each light texture map $\{L_{map(1)}, \ldots, L_{map(|B|)}\}$ of light texture component L with light capture data corresponding to a respective range of light directions. Light capture operation 308 also receives the blank 2D visibility map as input and is configured to populate the blank visibility map $V_{map}$ with visibility data for each point cluster $x_p$ corresponding to a set of scene light sources for each a respective range of light directions.

An enlarged sample of pixels taken from a representative light texture map $L_{Map(i)}$ are graphically represented in a left side of FIG. 7. As will be explained below, each pixel p across the set of light texture maps $\{L_{map(1)}, \ldots, L_{map(|B|)}\}$ is used to store a set of captured light data for a respective point cluster $x_p$, with each light texture map $\{L_{map(1)}, \ldots, L_{map(|B|)}\}$ corresponding to a respective predetermined range or "bin" b of light directions from the set of possible light directions D.

The right side of FIG. 7 graphically illustrates a ray path trace for a view ray 702 (e.g., a ray that represents the reverse direction of a light ray) from view plane 706 to a respective point cluster $x_p$ (e.g., a surface region that corresponds to a pixel of a 2D light texture map $L_{map(i)}$) and then towards a light source 704. The path trace for view ray 702 includes several bounces, representing that the path between light source 704 and point cluster $x_p$ includes a number of reflection points within the 3D scene 402 before the incoming light ray intersects the point cluster $x_p$. The view ray 702 illustrates a single light direction d from the set of possible light directions D.

The purpose of light capture operation 308 is to capture the lighting for each point cluster $x_p$ that is included in 3D scene 402 and represented by a respective pixel p across the set of 2D light texture maps $L_{map}$. The lighting for each point cluster $x_p$ is captured for a plurality of light directions d E D that intersect the point cluster $x_p$. In example embodiments, each light direction d is defined with respect to a local reference frame for the point cluster $x_p$. For each point cluster $x_p$ represented by a pixel p across the set of light texture maps $\{L_{map(1)}, \ldots, L_{map(|B|)}\}$ that are included in light texture component L light capture operation 308 is configured to generate a respective gathered light tensor $G_p$ that represents the incoming sources of light on the point cluster $x_p$, and a respective visibility value $V_p$ that represents a visibility probability of the point cluster $x_p$ In some examples, the captured light represents all incoming direct and indirect light at cluster $x_p$ for each direction d E D. Direct light refers to light from a light source that intersects point cluster $x_p$ without any intervening bounces (e.g., only one bounce occurs, namely at point cluster $x_p$, between a view plane 706 and the light source 704). Indirect light refers to light from a light source 704 that experiences one or more bounces before intersecting point cluster $x_p$.

Figure 8:
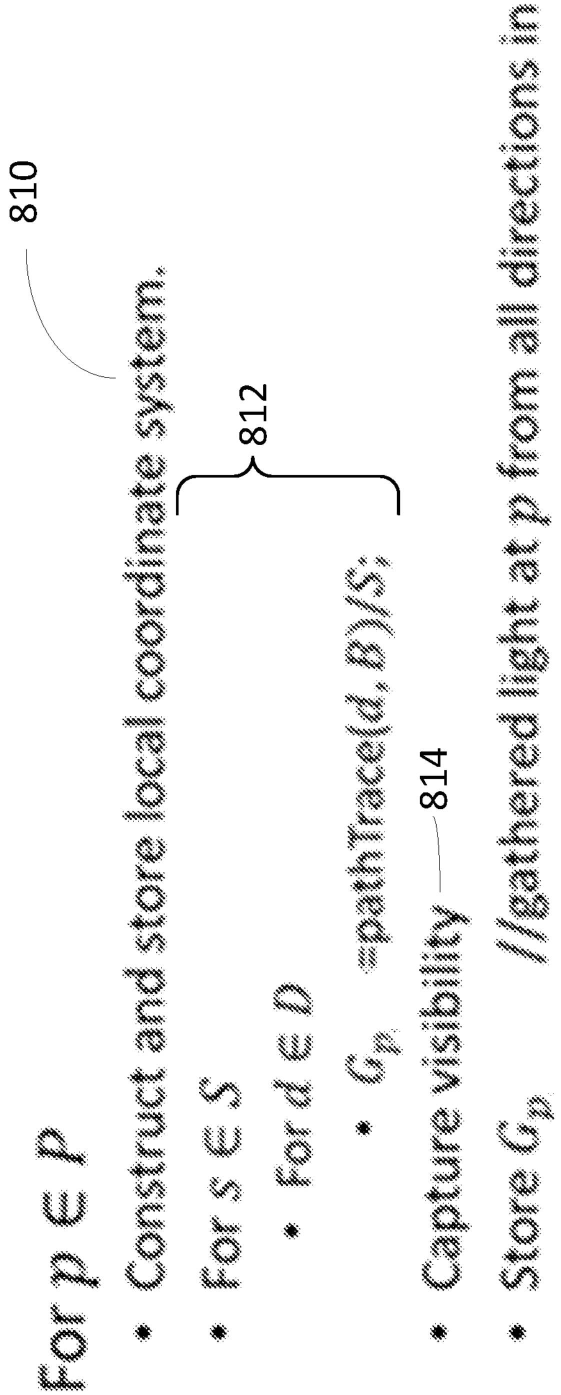
FIG. 8 illustrates a pseudocode representation of light capture operation performed by the server of FIG. 2.

FIG. 8 shows a pseudocode representation of a process 810 that can be performed as part of light capture operation 308 for capturing light data for the gathered light tensor $G_p$ for each pixel p E P. As noted above, each pixel p maps to respective point cluster $x_p$.

Figures 9A, 9B:
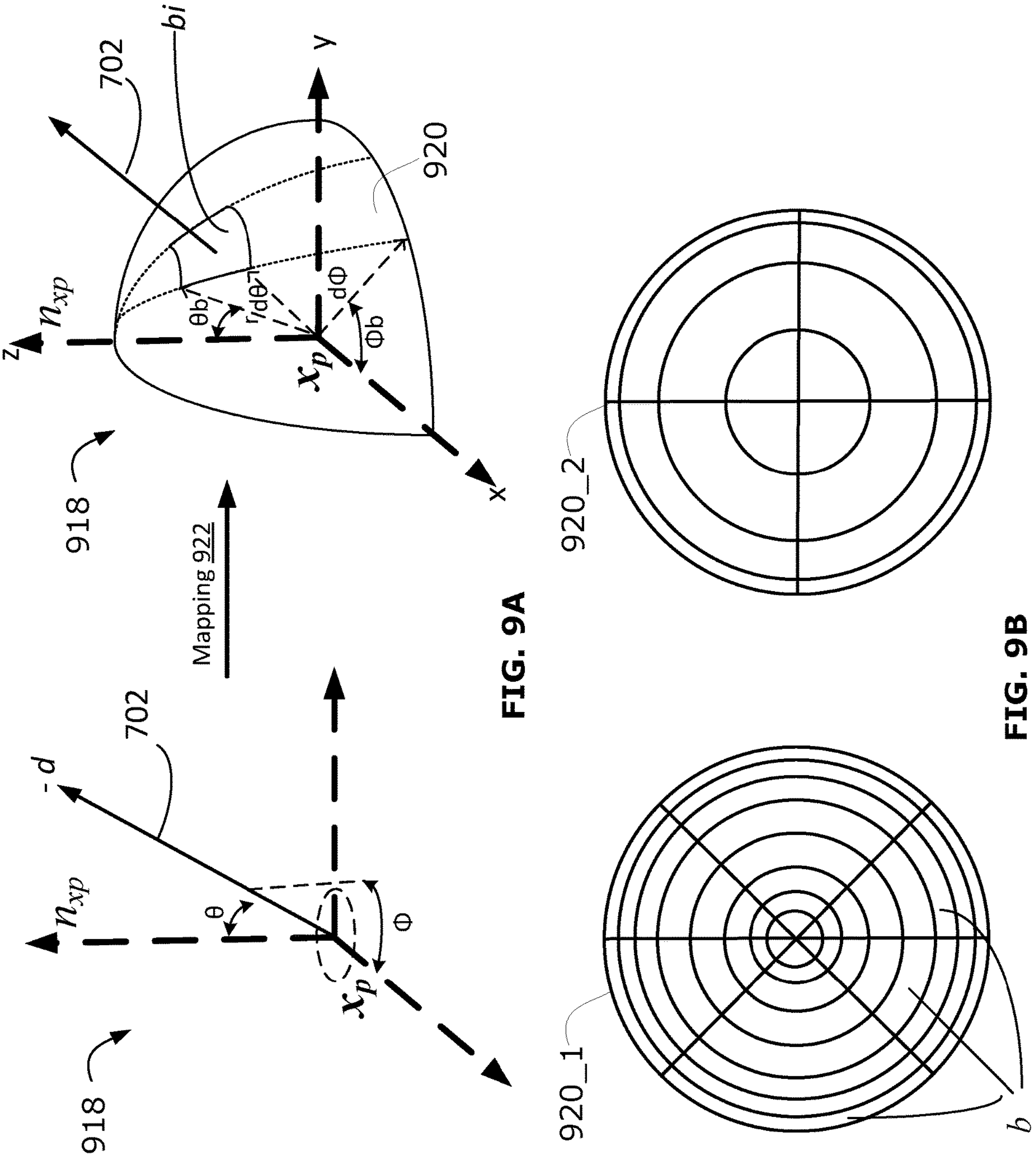
FIG. 9A is an perspective view of a light capture reference frame structure.
FIG. 9B illustrates plan views of two examples of light capture reference frame structures in accordance with examples of the present disclosure.

Step 1: As indicated at line 810, a local reference frame and bin structure is defined and stored for each point cluster $x_p$. The local reference frame and bin structure for a point cluster $x_p$ remains constant through the light capture operation 308 and also for a reconstruction operation (described below) that is performed at client device 104. With reference to FIG. 9A, in one example, the local reference frame 918 is defined by defining three orthonormal vectors relative to the 3D scene space coordinate system. The orthonormal vectors of local reference frame 918 includes a normal vector $n_{xp}$ that is normal to the face of target point cluster $x_p$. The direction d of a ray 702 intersecting point cluster $x_p$ can be defined using a pair of spherical coordinates [θ,ϕ] in the local reference frame 918.

In the illustrated example, the local reference frame 918 is divided into a spherical bin structure 920 that includes a set of discrete bins b E B that discretize all directions 22 about normal vector $n_{xp}$. Each bin b (one of which (bin bi) is shown in the right diagram of FIG. 9A) corresponds to a defined range of light directions (e.g., each bin corresponds to a respective subset of light directions d E D) relative to vector $n_{xp}$. In example embodiments, a plurality of pre-defined bin structures are available for use with local reference frame 920. For example, FIG. 9B shows plan-view examples of spherical bin structures 920_1 and 920_2, each having different number |B| of bins b. For example bin structures 920_1, 920_2 each include |B|=8×8 bins, and |B|=4×4 bins, respectively. Each bin b corresponds to a respective range (e.g., [θb,ϕb] to [θb+θd, ϕb+ϕd] of directions d in spherical coordinates with respect to normal vector $n_{xp}$.

In example embodiments, the local reference frame for all of the respective point clusters $x_p$ in a scene will use the same bin structure type (e.g., all the point clusters $x_p$ will have a respective local reference frame with the same number of bins).

Step 2: As indicated by lines 812 in FIG. 8, an iterative sampling routine is performed to collect gathered light samples, corresponding to each light direction d∈D, for the point cluster $x_p$. The gathered light samples are mapped to respective bins b. FIG. 9A illustrates a mapping operation 922 for view ray 702 wherein the ray direction-d is mapped to a bin bi that has a corner coordinate of (r,θb,ϕb). In example embodiments, the value of r is set to a constant, for example r=1, and thus does not to be specified in stored or transmitted coordinate data.

In one example, this iterative sampling routine is performed using a path tracing algorithm (represented in FIG. 8 as "pathTrace (d,B)"). The path tracing algorithm loops through all directions d E D to capture samples of gathered direct and indirect light from all sources for each direction d (where each direction d can be mapped to a respective bin b of the bin structure 920 for the local reference frame 918). For example, for each direction d, the path tracer algorithm pathTrace (d,B) can be called with a negative direction −d (e.g, a view direction) and a maximum number of light bounces B as input parameters. The output generated by the path tracer algorithm pathTrace (d,B) is the gathered light for direction d, which can be mapped to a respective bin b. By way of example, the gathered light from a direction d can be represented using a known color coding system, for example the red-green-blue (RGB) color coding system wherein an RGB color value is specified with respective r,g,b (red, green, blue) values. Each parameter (red, green, and blue) defines the intensity of the color of the received light as an integer value between 0 and 255.

The process is repeated to acquire S gathered light samples, which can include multiple captured light samples (e.g., RGB values) for each bin b. The value of S can be defined based on a desired quality of the generated light texture data. Practically, for scenes with complex geometry or highly specular materials, the value of S will typically be higher. The value of S will be reduced in scenarios where interactive, or real-time performance is desired. (Examples of post-processing using an AI model to enhance the light texture data in situations where a low value of S is used are described in greater detail below.) The S gathered light samples for each bin b are averaged to provide a final respective gathered light measurement $G_p$ (e.g., an RGB value) for the bin 940. The gathered light measurements $G_p$ for all d∈D for a point cluster $x_p$ (i.e., pixel p) are represented in the gathered light tensor $G_p=\{G_{p,1}, \ldots, G_{p,|B|}\}$, where |B| is the number of bins in the bin structure 920. Thus, gathered light tensor $G_p$ includes the set of averaged r,g,b color intensity values for each bin b & B of the local reference frame respective to point cluster $x_p$.

In the above example, direct and indirect light is included in the respective gathered light measurement $G_p$. However, in some examples, direct light sources (e.g., bounce only at cluster point $x_p$) can be omitted from the samples used to calculated the gathered light measurement $G_p$ such that the gathered light measurement $G_p$ corresponds to only indirect light sources.

Step 3: as indicated in line 814 "Capture Visibility" represents an operation that is applied to generate the respective visibility value $V_p$ for each point cluster $x_p$ (i.e., pixel p). Each element $V_p$ is a visibility probability value that the corresponding point cluster $x_p$ is directly visible from all the light sources 704 available in a scene. In some examples, multiple view ray paths (i.e., light directions) are sampled for each point cluster $x_p$ to determine a respective visibility probability value $V_p$. To compute visibility probability for each point cluster $x_p$, multiple ray paths towards all kind of light sources available in the scene are sampled, and if the ray path directly hits a light source 705 without intersecting other scene surfaces, it is a hit, otherwise it is a miss. The visibility probability is defined as the portion of hits to the total number of ray paths.

Figure 9C:
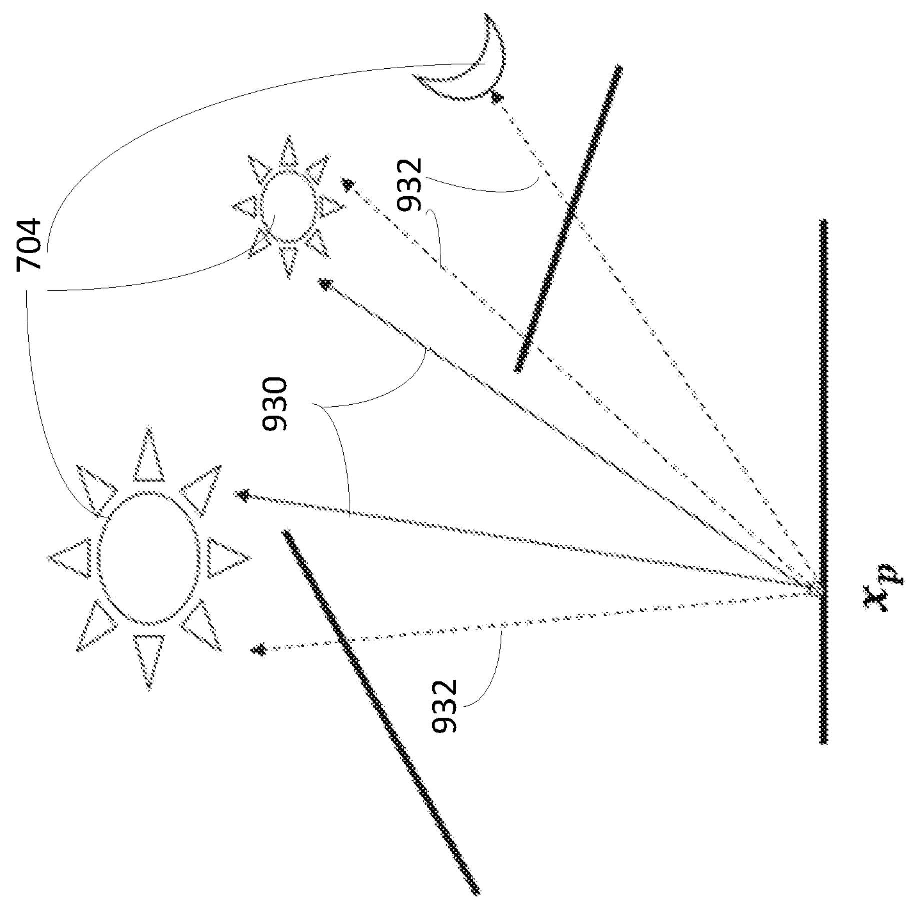
FIG. 9C illustrates visibility of a point cluster relative to a set of light directions.
Figure 9C:
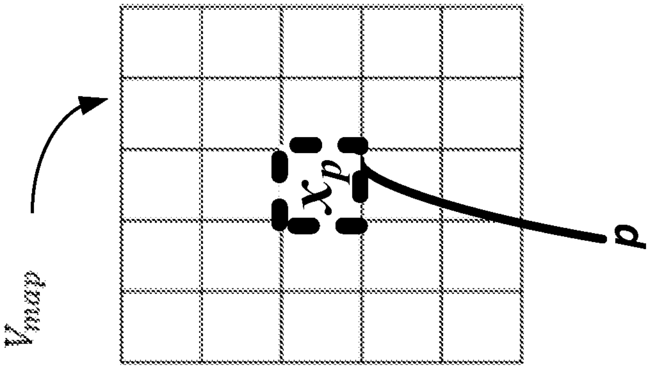

By way of example, the right half of FIG. 9C illustrates an example showing a variety of light sources 704 in a scene that includes a point cluster $x_p$. Solid lines 930 and dashed lines 932 illustrate a set of 5 ray path traces, with dashed lines 932 illustrating light directions that are blocked (e.g., do not provide a direct line of sight from a light source to point cluster $x_p$). In the illustrated example 2 of the 5 ray path traces have a direct path from the point cluster $x_p$ to light sources 704, such that the visibility probability value $V_p$ is 2/5=0.4.

In some examples, Visibility probability $V_p$ can depend on types of light sources. For example, with respect to a point light source, a point cluster $x_p$ is either visible or invisible, in which case the visibility probability $V_p$ will have a value of 0 or 1. In the case of an area light source, a point cluster $x_p$ may be visible, invisible, or partially visible, in which case the visibility probability $V_p$ of the point cluster $x_p$ cluster is between 0 and 1.

For reference purposes, the left half of FIG. 9C illustrates mapping of the point cluster $x_p$ to its respective pixel p in visibility map $V_{map}$.

In summary, process 810 generates the following light capture data for each point cluster $x_p$ (e.g., a surface region which corresponds to a respective pixel p in light texture map $L_{Map}$): (i) a local reference frame definition that defines the local reference frame 918 relative to the coordinate system for the 3D scene space 402; (ii) a gathered light tensor $G_p$, including respective sets of r,g,b color values for each of the bins b & B of the selected bin structure 920; and (iii) a visibility probability value $V_p$ for the point cluster $x_p$. The light capture operation 308 is configured to store the light capture data for all point clusters $x_p$ in a light capture data structure $L_{capture}$. An example of a data structure that can be used for light capture data structure $L_{capture}$ is shown in FIG. 10A.

In example embodiments, all of the light capture data values that are computed by the process of FIG. 8 are either positive or can be made positive without losing accuracy. This property can be exploited to minimize a size of light capture data structure $L_{capture}$ as only positive values need to be represented. For example: the spherical coordinates [θ, ϕ] for the local reference frame each can fall within the range of [0, 2π]; gathered light tensor $G_p$ comprises a set of r,g,b color values within a known range of [0,255]; and visibility probability $V_p$ is a probability value and thus inherently has a value in the range of [0,1]. As the minimum and maximum of the three types of light capture data values are known, the values can each be mapped to pre-defined ranges while maintaining accuracy up to a defined level. In example embodiments, the [0, 2n] range for each of spherical coordinates [θ, ϕ] is mapped to a [0,1] range, and the [0,255] range for the r,g,b color values for gathered light $G_p$ can be scaled to [0,1], using floating point values with an accuracy of 1/255, enabling each data variable to be stored as a single byte. In some examples, the maximum RGB value and storage size can be increased based upon the desired quality of the application, e.g. to capture high dynamic colors, a color value range of [0, 65535] can be used, which can also be scaled to [0, 1] with an precision of 1/65535 and stored in 2 bytes).

Figure 10A:
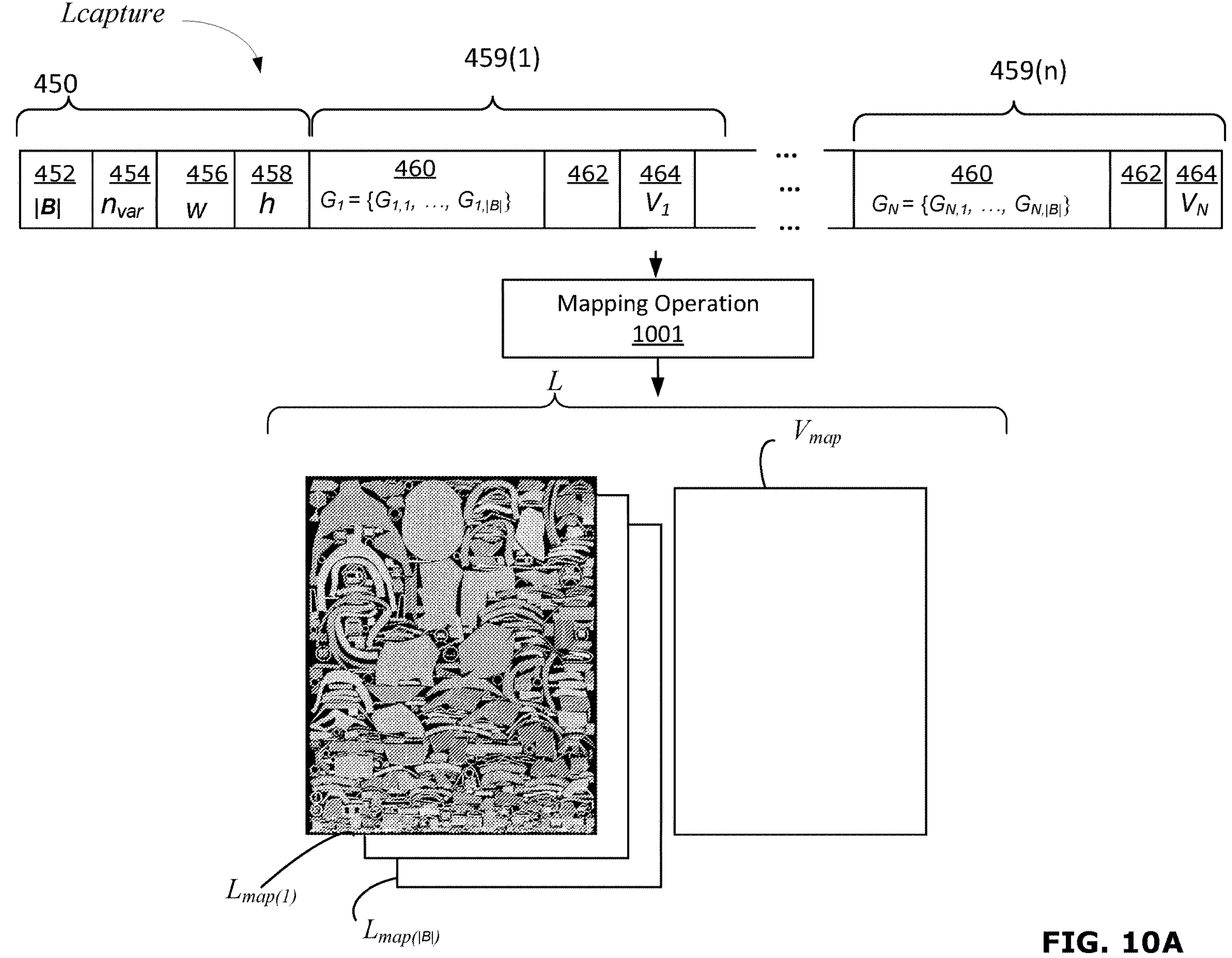
FIG. 10A is a light capture data structure generated by the example server of FIG. 1.

In this regard, as shown in FIG. 10A, light capture data structure $L_{capture}$ includes a header 450 that comprises first, second, third, and fourth descriptors 452-458 that provide information about the format of the remainder of the light capture data structure $L_{capture}$. In one example: (i) descriptor 452 is a byte in length and be used to indicate the number |B| of bins b included in the selected bin structure 920 (which corresponds to the number of gathered light measurements $G_p$ included in each gathered light tensor $G_p$) (ii) descriptor 454 is a byte in length and indicates a number $n_{var}$ of variables that are used, in addition to gathered color light measurements, for each point cluster $x_p$ (for example, $n_{var}$ can be used to indicate that the structure 930 also includes two additional variables, namely a local reference frame definition and the visibility probability $V_p$, for each point cluster); and (iii) descriptors 456 and 458 respectively store the values of $w_{max}$ and $h_{max}$ and are each 2 bytes in length (where $(w_{max} \times n_{max})$ is the total number (n) of point clusters $x_p$ that are represented in light texture component L).

Header 450 is followed by $n=(w_{max} \times n_{max})$ pixel data sections 459(1) to 459(*n*) (with 459(*p*) referring to a generic pixel section). Each pixel section 459 corresponds to a respective pixel p and includes the light capture data collected by light capture operation 308 for a respective point cluster $x_p$. In particular, each pixel section 459(*i*) includes a color data field 460 for gathered light tensor $G_p=\{G_{p,1}, \ldots, G_{p,|B|}\}$. In the illustrated example, color data field 460 is (|B|×3) bytes long, with three bytes used for the point cluster $x_p$ specific gathered light $G_{p,b}$ values for each bin b. One byte is used for each of the r,g,b color values, respectively.

Each pixel section 459(*i*) also includes a local reference frame section 462 that can be, in an example embodiment, 4 bytes in length for including a definition of the local frame reference. For example 2 bytes can be used for storing coordinates for the normal vector $n_{xp}$ and two bytes to store coordinates for one of the two reference frame coordinate vectors that are orthogonal to it (the third orthonormal vector can be computed during a future rendering task based on the provided vector data for the other two orthogonal vectors).

Each pixel section 459(*i*) also includes a visibility probability section 464 for the visibility probability value $V_p$. In the illustrated example, visibility probability section 464 is 1 byte long.

The light capture data structure $L_{capture}$ contains the light texture data that is used to populate the bin-specific light texture maps $\{L_{Map(1)} \ldots, L_{Map(|B|)}\}$ and visibility map $V_{Map}$. In particular, the light capture data structure $L_{capture}$ is converted by a mapping operation 1001 of server 102 into a set of light texture maps $\{L_{Map(1)}, \ldots, L_{Map(|B|)}\}$ and a visibility map $V_{Map}$ that take the form of respective image files that conform to the portable network graphics (PNG) format. As indicated above, the set of light texture maps $L_{Map}$ includes a total |B| of light texture maps $\{L_{Map(1)}, \ldots, L_{Map(|B|)}\}$, (each light texture map $L_{map(i)}$ including the light texture data for a respective bin (i.e. a respective range of light directions)), as well as corresponding visibility map $V_{Map}$. Thus, each respective light texture map and visibility map can be considered to be a respective bin texture image and bin visibility image.

In the illustrated example, each gathered light tensor $G_p$ includes the light texture data for a single pixel p across the set of light texture maps $\{L_{Map(1)}, \ldots, L_{Map(|B|)}\}$. Mapping operation 1001 processes the light capture data structure $L_{capture}$ to respectively populate each of the |B| previously blank light texture maps $\{L_{Map(1)}, \ldots, L_{Map(|B|)}\}$ that were previously appended to intermediate 3D scene model 108. The visibility probability value $V_p$ includes the visibility probability for a single pixel p. Mapping operation 1001 processes the light capture data structure $L_{capture}$ to respectively populate the previously blank visibility map $V_{Map}$ that was previously appended to intermediate 3D scene model 108.

Although other transmission formats can be used for light capture data structure $L_{capture}$, conversion into a .png format allows light texture maps $L_{Map}$ to take advantage of lossless compression and is well-suited for storing color data that covers area will small color variation.

Referring again to FIG. 3, the server 102 generates the edited gITF 3D scene model 106E with a set of appended light texture components L as populated by light capture operation 308, to provide enhanced 3D scene model 108. As will be explained below, the data that has been added to the enhanced 3D scene model 108 relative to the input 3D scene model 106 can enable scene rendering tasks to be performed using relatively fewer computational resources that would be required for the same tasks using only the input 3D scene model 106. Accordingly, enhanced 3D scene model 108 can, in at least some scenarios, be used to enable realistic and fast scene image rendering by support devices with lower computational resources, such as client device 104.

As noted above in respect of FIG. 8, when generating data for each pixel, a total of S light samples are captured (i.e., computed) for each pixel for each bin, and the gathered light samples for each pixel are averaged to provide a final respective gathered light measurement $G_{p,b}$(e.g., an RGB value) for the pixel for bin 940. Similarly, a total of S samples are used to determine visibility probability values for each pixel. Producing high quality light textures relies on drawing a sufficient number of samples per pixel (SPP). However, in real time scenarios, even when this operation is offloaded to a computationally capable server 102, the resources required to gather a large number of a light samples per pixel can become a computational bottleneck for complex scenes. Accordingly, in at least some real time scenarios that use complex scenes, it can be necessary to either reduce the number of samples per pixel or to use a light texture with a smaller spatial resolution. These solutions can result in one or more of undesired visible noise, aliasing artifacts, and/or a restricted resolution of the final renderings.

Accordingly, there is a need for a solution that can address scenarios in which the real-time operation constraints of server 101 are such that a sufficient number of samples per pixel required for a high-quality, high resolution textures cannot be directly generated using the above described ray tracing techniques. Example aspects of the present disclosure are directed to solving the problem where real-time generation of high quality, high resolution light texture data is not practical. In particular, a pre-trained AI model is leveraged to enhance input light texture data in which a low number of samples per pixel, or a lower native resolution, has been applied. The AI model outputs AI-enhanced light texture data that can achieves equivalent quality compared to the scenario in which the input light texture data had been originally generated with sufficient number of samples through path tracing at a desired resolution. The disclosed solution can address the high computational cost on the server side (e.g., server 102) due to light texture capture using path tracing algorithms. The pre-trained AI model is used to enhance light information with a negligible cost while providing equivalent quality compared to a path traced result with sufficient samples per pixel.

Accordingly, in the presently described example, light texture data enhancement module 310 is configured to process a 3D scene model 108 that includes as set of light texture maps $\{L_{Map(1)}, \ldots, L_{Map(|B|)}\}$ and corresponding visibility map $V_{Map}$ in which the number of light samples per pixel captured during the process of FIG. 8 has, by necessity, been reduced to a low number (for example, even as low as S=1). In such a scenario, the light texture data enhancement module 310 applies a trained AI model 312 to take lower-quality light texture component $L=\{L_{Map(1)}, \ldots, L_{Map(|B|)}\}$ and $V_{Map}$ as input, and enhance the light texture data (e.g., enable one or more of noise removal, sharper detail recovery, and/or anti-aliasing, among other possible enhancements) and visibility probability data in a computationally efficient manner. The resulting enhanced light texture component $L^E=\{L^E_{Map(1)} \ldots, L^E_{Map(|B|)}\}$ includes high-quality light information that can then be provided as part of enhanced 3D scene model 109 to client devices 104.

Figures 10B, 10C:
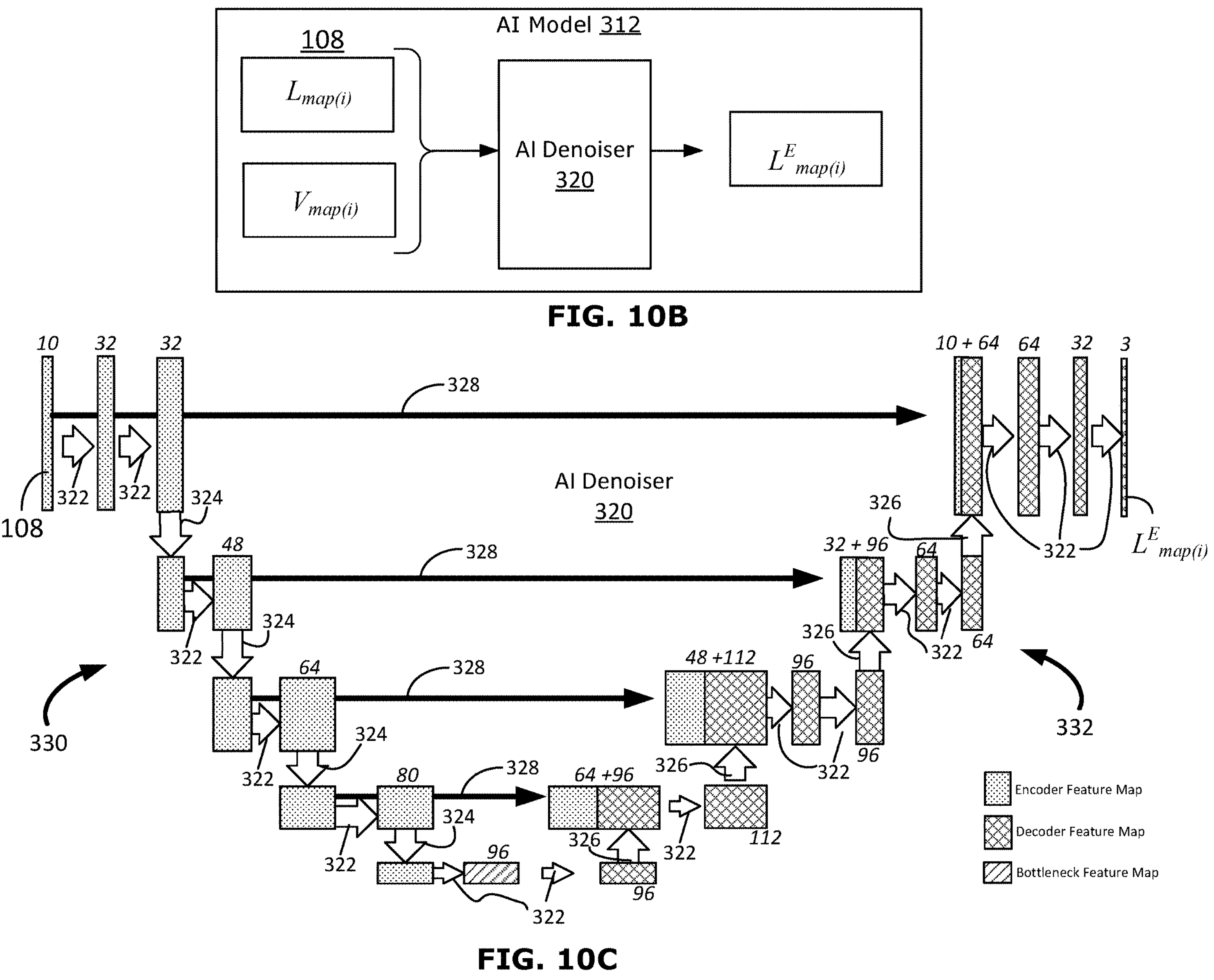
FIG. 10B is a block diagram of an AI model that can be applied in the operations of FIG. 3 according to example embodiments.
FIG. 10C is a block diagram of an example architecture of the AI model of FIG. 10B, according to example embodiments.

As each of the directional specific light texture maps $\{L^E_{Map(1)}, \ldots, L^E_{Map(|B|)}\}$ and the visibility map $V^E_{Map}$ is formatted as a respective image file, in example embodiments the trained AI model 312 can be based on AI-based image processing techniques. By way of example, as shown in FIG. 10B, in one example the trained AI model 312 can be implemented using an AI denoiser 320 that takes the sets of input light texture maps $\{L_{Map(1)}, \ldots, L_{Map(|B|)}\}$ and visibility map $V_{Map}$ and outputs a respective enhanced set of light texture maps $\{L^E_{Map(1)}, \ldots, L^E_{Map(|B|)}\}$ of the same spatial resolution. A number of different possible model architectures can be used to implement AI denoiser 320, including for example a convolutional autoencoder such as available from the Intel™ Open Image Denoise open source library. Other suitable AI models can alternatively be used, including for example models that are based on a vision transformer or a recurrent neural network.

In this regard, FIG. 10C shows an example of a possible architecture that may be used for AI denoiser 320 in an example embodiment. In the example of FIG. 10C, the stippled pattern blocks represent respective encoder feature maps, the cross-hatch pattern blocks represent respective decoder feature maps, and the upward diagonal pattern block represents a bottle neck feature map. The italic numbers at the top or bottom of each block indicates the depth dimension (e.g., number of channels, with each channel consisting of a byte per pixel) of the respective feature map. The arrows represent respective operations, with: rightward horizontal arrows 322 each representing a respective 3×3 convolution plus a Rectified Linear Unit (ReLU) operation; downward arrows 324 each representing a respective Max Pooling operation (downsampling); upward arrows 326 each representing a respective upsample 2×2 (linear interpolation) operation; and rightward horizontal arrows 328 each representing a respective copy and concatenation operation.

In the example of FIG. 10C, the input image data corresponding to a single set of bin images for 3D scene model 108 has 10 channels, including 3-channel texture map $L_{Map(i)}$, 1-channel visibility map $V_{Map}$, 3-channel albedo map and a 3-channel surface normal map. The same 1-channel visibility map $V_{Map}$ can be concatenated with each bin-specific texture map 3-channel texture map $L_{Map(i)}$ (e.g., the same visibility map $V_{Map}$ is used for all bins). In example embodiments, the server 102 is configured to provide the albedo and surface normal maps as part of edited gITF edited 3D scene model 106E. In particular, each point cluster $x_p$ has some properties that define the material, texture and geometry of that point cluster $x_p$. The normal and albedo maps each include some of these properties. The normal map provides tangential orientation of a surface at point cluster $x_p$ (e.g. the $n_{xp}$ vector in FIG. 7). The albedo map indicates the base color of a point cluster $x_p$, i.e. the fraction of light that a surface point reflects. The spatial resolution of both normal and albedo maps can be the same as the light texture and visibility maps, and can be concatenated together as the input image data. In some examples, for each point cluster $x_p$, the normal and albedo information can be samples from nearby points where these properties are defined in the original scene model 106.

In some examples, the 3-channel albedo map and 3-channel surface normal map can be omitted from the input image data such that the single set of bin images for 3D scene model 108 has only 4 channels, including 3-channel texture map $L_{Map(i)}$, 1-channel visibility. However, the inclusion of the 3-channel albedo map and 3-channel surface normal map in the input image data can enable a better enhancement result. In some examples, 1-channel visibility map $V_{Map}$ can be omitted.

The output image maps for each input texture map $L_{Map(i)}$ (in combination with visibility map $V_{Map}$) enhanced 3D scene model 109 is 3-channel enhanced texture map $L^E_{Map(i)}$.

In some examples, the the visibility map $V_{Map}$ can also be enhanced by the AI model 312, and in such examples the output image maps would be a 3-channel enhanced texture map $L^E_{Map(i)}$ plus a 1-channel enhanced visibility map $V^E_{Map}$.)

The AI denoiser 320 of FIG. 10C is a fully convolutional, encoder-decoder style U-Net (see for example, Ronneberger, O., Fischer, P., & Brox, T. (2015). U-Net: Convolutional Networks for Biomedical Image Segmentation. *Medical Image Computing and Computer-Assisted Intervention*. He, K., Zhang, X., Ren, S., & Sun, J. (2016)) with 4 levels at both an encoder side 330 and a decoder side 332. On the encoder side 330, the spatial dimension gets contracted, and the features gradually become deeper representing higher level abstractions. The decoder side 332 includes a set of operations that mirror those of the encoder side 330, however feature maps from the encoder side are combined with the corresponding feature maps at the decoder side 332 through a skip connection (copy and concatenate operation 328) (see, for example He, K., Zhang, X., Ren, S., & Sun, J. (2016). Deep Residual Learning for Image Recognition. *IEEE Conference on Computer Vision and Pattern Recognition* (CVPR), (pp. 770-778). Las Vegas, NV, USA.) This skip connection is added at each corresponding encoder-decoder level to ensure the recovery of details that could have been lost during the downsampling operations 324.

Figure 10D:
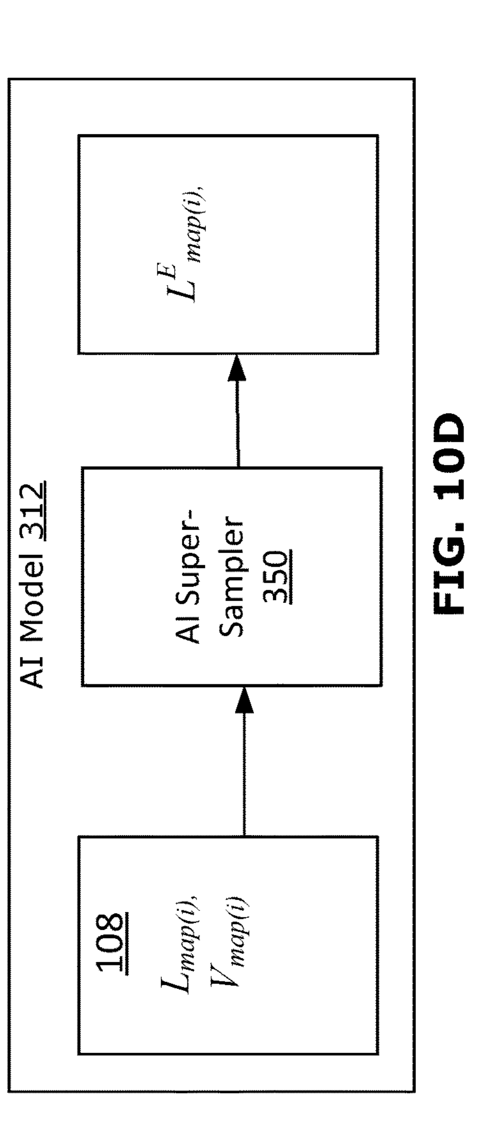
FIG. 10D is a block diagram of a further AI model that can be applied in the operations of FIG. 3 according to example embodiments.

FIG. 10D illustrates further example implementation in which the trained AI model 312 can be implemented using an AI super-sampler 350 rather than AI denoiser 320. AI super-sampler 350 takes the set of input light texture maps $\{L_{Map(1)}, \ldots, L_{Map(|B|)}\}$ and outputs enhanced set of light texture maps $\{L^{E}_{Map(1)}, \ldots, L^{E}_{Map(|B|)}\}$ of higher spatial resolution., e.g., a factor of 2 super resolution. Such a solution can leverage the AI super-sampler 350 to super resolve light texture generated at a lower native spatial resolution, such that the output AI-enhanced light texture data carries sufficient light information for higher resolution renderings. An example of a suitable model that can be configured to implement AI super-sampler 350 can be seen in Lim, B., Son, S., Kim, H., Nah, S., & Lee, K. (2017). Enhanced Deep Residual Networks for Single Image Super-Resolution. *IEEE Conference on Computer Vision and Pattern Recognition* (*CVPR*) *Workshops*.

Figure 10E:
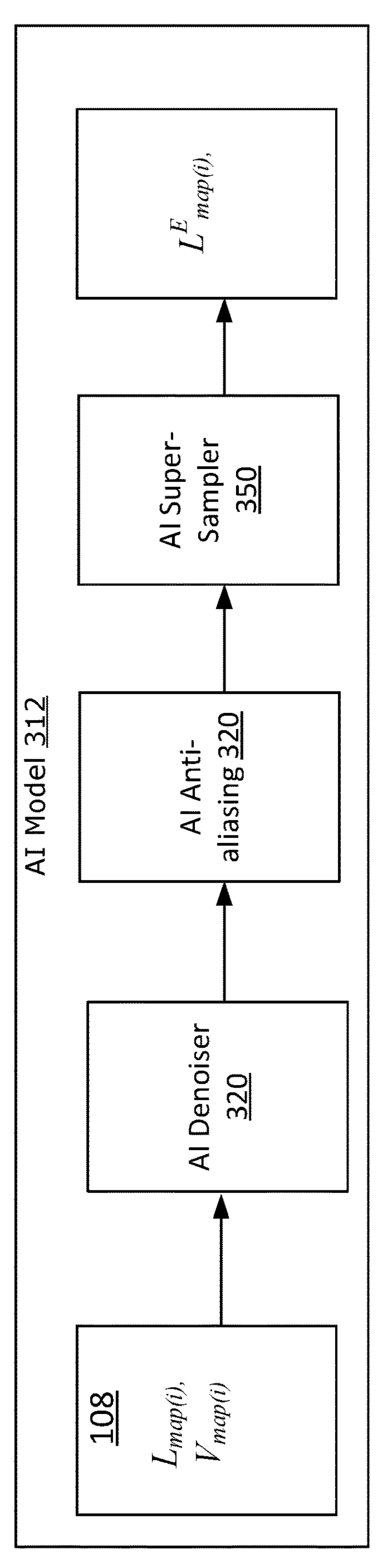
FIG. 10E is a block diagram of a further AI model that can be applied in the operations of FIG. 3 according to example embodiments.

FIG. 10E illustrates further example implementation in which the trained AI model 312 can be implemented using a multiple AI models cascaded together to carry out a series of functions. For example, AI denoiser 320, an anti-aliasing model 360 and super-sampler 350 can be configured to work together for joint denoising, anti-aliasing and super sampling. Anti-aliasing model 360 can be implemented using any suitable AI model that will work in conjunction with the above-described AI denoiser 320 and super-sampler 350. The multiple AI models of trained AI model 312 can include other types of enhancement performing AI models other than or in addition to those illustrated in FIG. 10E.

Although the above examples illustrate AI model 312 processing light texture data that is represented in image format, in some examples the AI model 312 could be configured to operate on vector format data such as the format used for light capture data structure $L_{capture}$. In such examples, mapping operation 1001 could be delayed until after the enhanced light texture data has been generated.

Figure 11:
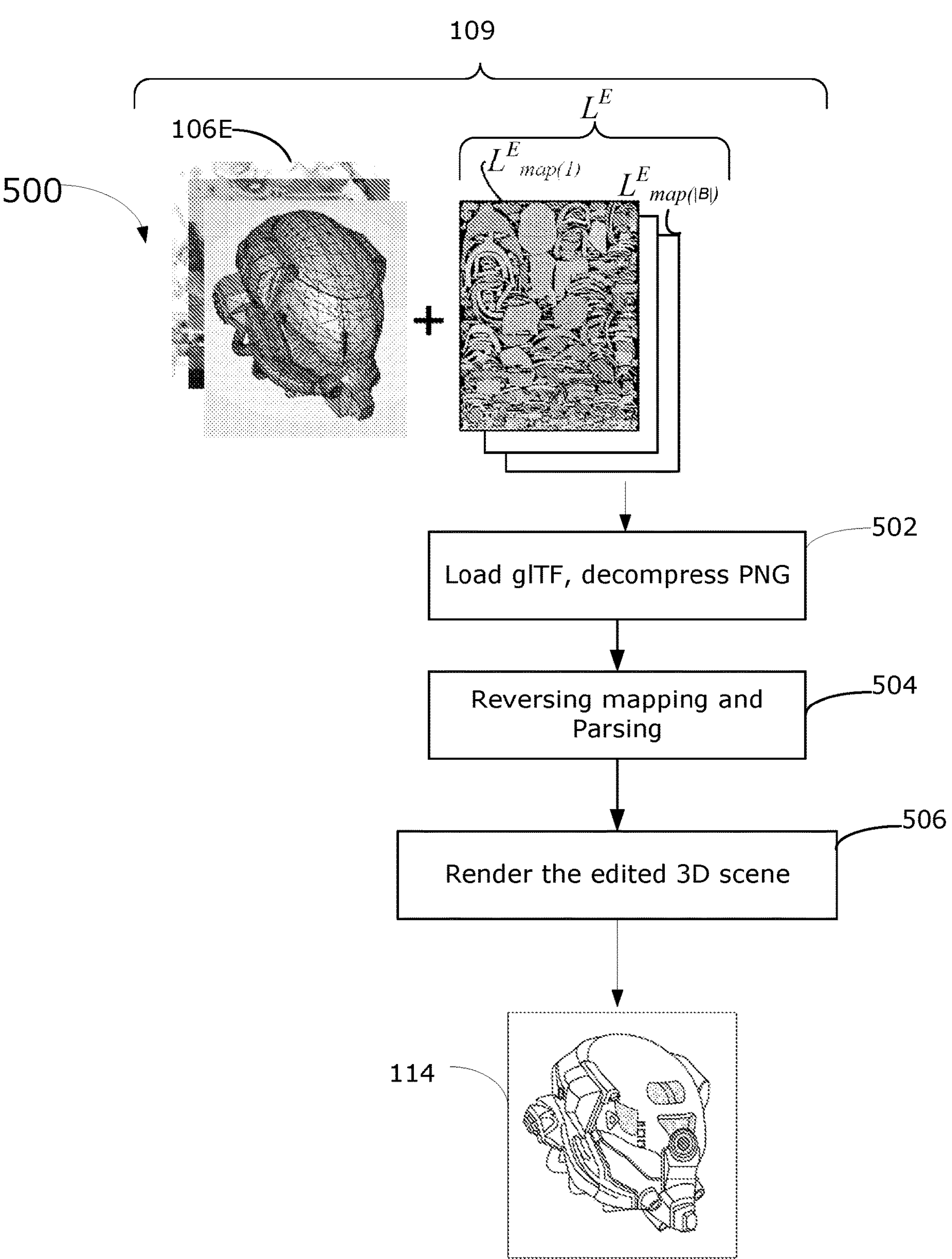
FIG. 11 is a flowchart illustrating an example method for physically based rendering a scene image that is implemented by an example client device of FIG. 1.

Client device 104 processing of an enhanced 3D scene model 109 to render a physically based realistic scene image 114 will now be explained in greater detail with reference to FIG. 11, according to example aspects of the disclosure. As indicated at block 502, the enhanced 3D scene model 109, including edited 3D scene model 106E and PNG format light texture map $L_{Map}$, IS obtained as input by client device 104 through a communication network or other medium. The edited 3D scene model 106E is loaded using a .gltf loader. The PNG format light texture maps $L^{E}_{Map(1)}, \ldots, L^{E}_{Map(|B|)}$ are decompressed to provide a recovered version of light measurement data that was included in light capture data structure $L_{capture}$.

As indicated at block 504, the recovered light capture data structure $L_{capture}$ can then be processed to recover captured light data. For example, the light capture data structure $L_{capture}$ can be parsed to extract the header 450 parameters $n_D$, $n_{var}$, w and h. The light capture data structure $L_{capture}$ can be further parsed to recover, for each of the n point clusters $x_p$: a respective gathered light tensor $G_p=\{G_{p,1}, \ldots, G_{p,|B|}\}$, the two vectors that define the respective local fame reference data for the point cluster $x_p$, and the respective visibility probability $V_p$ for the point cluster $x_p$. The color values for each of the gathered light tensors can be scaled back up from [0,1] to [0,255], and similarly, any scaling to [0,1] performed in respect of the coordinate frame reference values can also be reversed.

As indicated at block 506, the light capture data structure $L_{capture}$ and loaded edited gITF edited 3D scene model 106E can be used by client device 104 to render a globally illuminated scene image 114 that corresponds to a respective view direction 112. One or more view directions 112 can, for example, be provided through successive user interactions with an input interface of the client device 104, thereby enabling an interactive viewing experience of successive images from different view directions of the 3D scene space.

Figure 12:
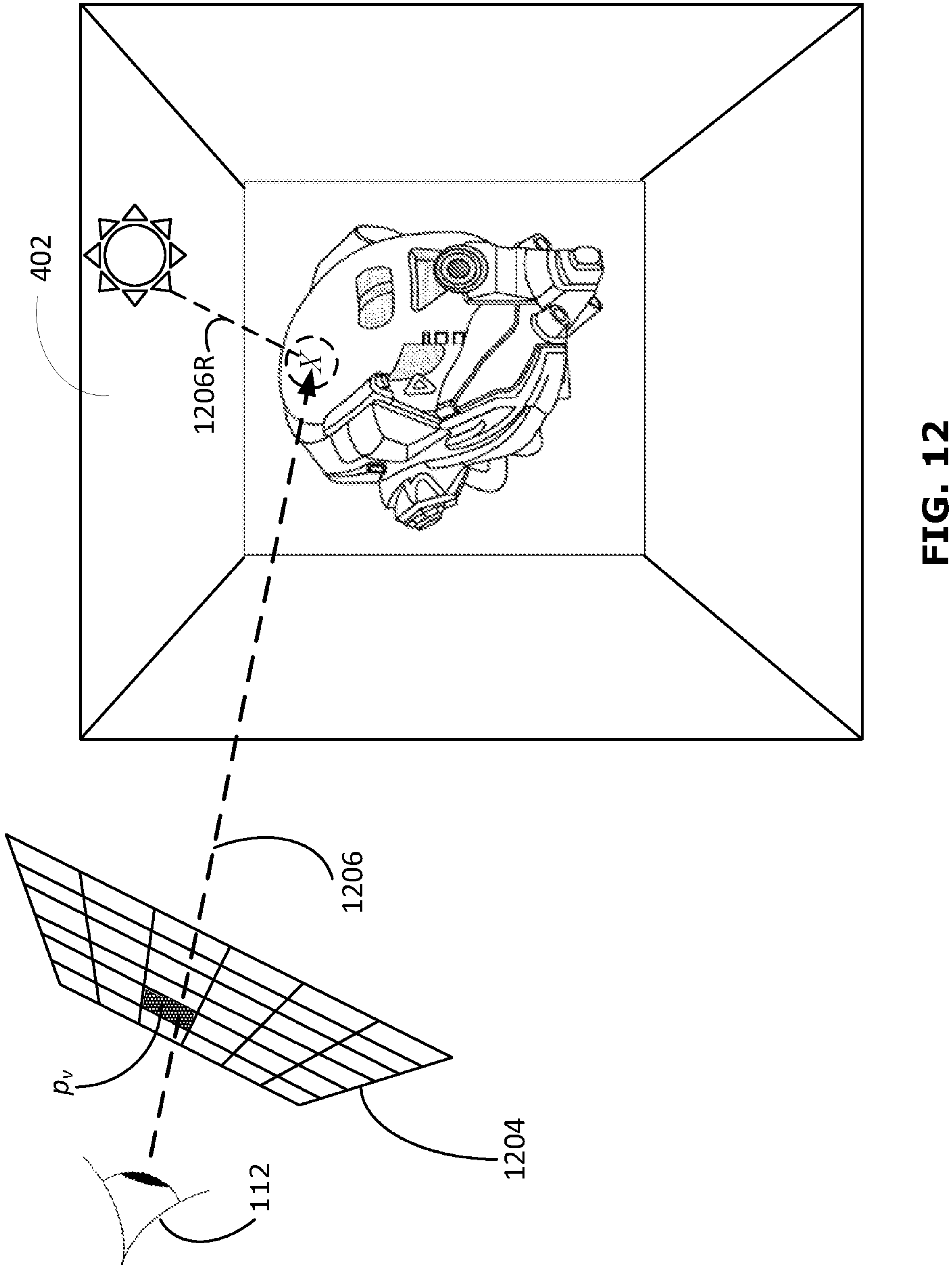
FIG. 12 shows an example of a view ray shot into a 3D scene space.

With reference to FIG. 12, in order to construct and render a scene image 114, client device 104 can apply a version of a light path tracer algorithm. The light tracer algorithm simulates a respective reverse direction (−d) light ray (i.e., a view ray) 1206 into the 3D scene space 402 shot through each of the pixels $p_v$ of an image plane 1204. The image plane 1204, which can correspond to rendered scene image 114, is positioned relative to the 3D scene space 402 in a location that corresponds to the input view direction 112. The image plane 1204 is a $w_r$ by $h_r$ matrix of pixels $p_v$.

Figure 13:
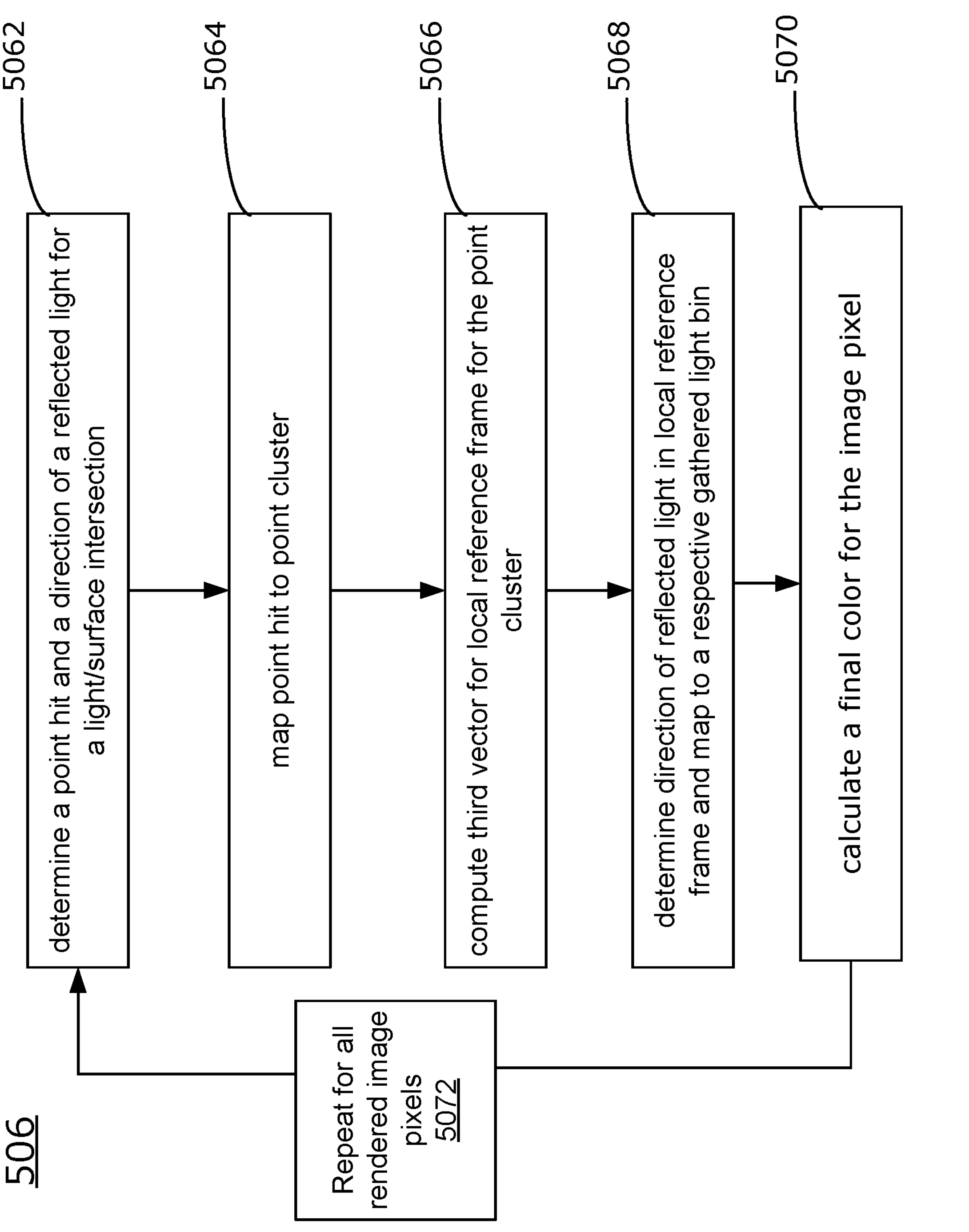
FIG. 13 is a flowchart illustrating an example method for a rendering operation of the method of FIG. 11.

Actions that can be performed by client device 104 as part of rendering block 506 to render scene image 114 for a specified view direction 112 are illustrated in FIG. 13, according to an example embodiment. In example embodiments, a light path tracer algorithm is applied to simulate one or more respective view rays 1206 for each image plane pixel $p_v$ of the view plane 1204. The following set of actions is performed for each view ray 1206:

Block 5062: for each view ray 1206, determine the x,y,z coordinates (i.e., a point hit location x) in the 3D scene space 402 for the point at which where the view ray 1206 first interacts with a surface. Based on the point hit location x, fetch the corresponding surface material that is specified for the point hit location x in the appearance data 251 of enhanced 3D scene model 109. In examples, the surface material will be specified as part of the appearance data 251 that was included in the input 3D scene model 106, and may for example include one or more of a color or a texture or a combination thereof. Based on the angle of the view ray 1206 and the properties of the fetched surface material, a direction y of the reflected view ray 1206R is computed.

Block 5064: Based on the point hit coordinates, and the geometric data $L_{gm}$ included in the enhanced gITF 3D scene model 109, the point hit location x is mapped to a respective point cluster $x_p$ represented in the light capture data structure $L_{capture}$ (which corresponds to a respective pixel of the light texture map $L_{map}$).

Block 5066: Obtain the local reference frame definition data for the point cluster $x_p$ from the light capture data structure $L_{capture}$. For example, this can include information that defines two of the three orthogonal vectors that define the respective local fame reference data for the point cluster $x_p$. The third orthogonal vector for the local reference frame can be computed using a cross product between the two known orthogonal vectors.

Block 5068: Map the direction y of the reflected view ray 1206R to a respective gathered light measurement $G_p$ (i.e., a respective bin b) within the gathered light tensor $G_p=\{G_{p,1}, \ldots, G_{p,|B|}\}$.

Block 5070: Calculate a final rendering color value for the image plane pixel $p_v$ based on: gathered light measurement $G_p$ (which is a set of r,g,b color values in the illustrated example) for the point cluster $x_p$; the visibility probability $V_p$ for the point cluster $x_p$; and the material property extracted from the edited glTF 3D scene model 106E. For a hit point 'x', the visibility probability is used to attenuate the value of incoming direct light towards 'x'. If 'x' is completely visible, the visibility probability will be 1, and therefore the direct light value arriving at 'x' won't be changed. However, if 'x' is partially visible, or completely invisible, the visibility probability will be less than 1 and attenuate the amount of direct light arriving at 'x'. The fetched indirect light values along with the visibility, material, and direct light values comprise the components needed to solve an approximation to the rendering equation in order to compute the final color of the pixel. The final rendering color value computed for the image plane pixel $p_v$ is the color value for a corresponding pixel in rendered scene image 114.

As indicated at block 5072, the process is repeated for all image plane pixels $p_v$ to generate rendered scene image 114 for view direction 112.

Figure 14:
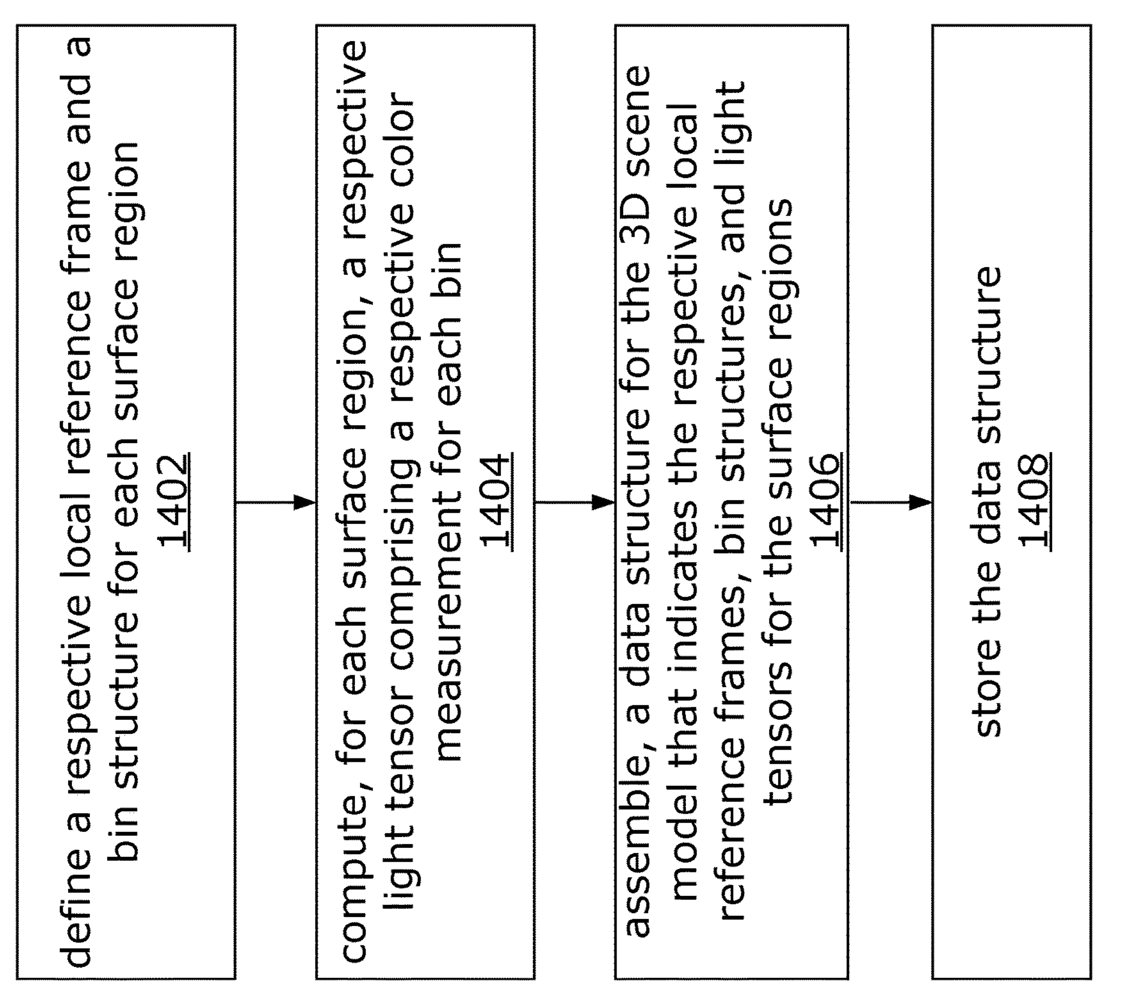
FIG. 14 is an example of a method that can be performed at a server of the system of FIG. 1.

By way of overview, FIG. 14 illustrates an example of a method performed at the server 102 according to an example embodiment. In the example of FIG. 14, the server 102 processes 3D scene model 106E that defines geometry and appearance of one or more objects in 3D scene space 104. As indicated at Block 1402, for each surface region (e.g., each point cluster $x_p$) a plurality of surface regions that collectively represent a surface of the one or more objects, the server 102 defines a respective local reference frame 918 and a bin structure 920, the bin structure 920 discretizing the local reference frame 918 into a set of bins b E B, each bin corresponding to a respective range of light directions that intersect the surface region. As indicated at Block 1404, for each surface region, the server 102 computes a respective light tensor $G_p=\{G_{p,1}, \ldots, G_{p,|B|}\}$ comprising a respective color measurement $G_p$ for each bin b of the bin structure 920 for the surface region, the respective color measurement for each bin being based on a path trace of one or more light ray samples that fall within the respective range of light directions corresponding to the bin. As indicated at Block 1406, the server 102 assembles a data structure (e.g., light capture data structure $L_{capture}$ or light texture map $L_{Map}$). As indicated at Block 1408, the server 102 stores the data structure.

It will be appreciated that in at least some scenarios the systems and methods described above can shift computationally demanding operations related to path tracing to calculate colors for incoming light directions to a computationally capable server, such that a client device can render a photorealistic image without excessive computational resources costs. The client device obtains pre-computed parameters that are stored in a data structure when the physically realistic rendering is performed, and thus calculation of a color of bounces for a cluster is avoided at the client device. Thus, the physically realistic rending may be increased at a computationally constrained client device.

Although the generation of enhanced light texture data $L^E$ by light texture data enhancement module 310 using AI model 312 has been described in respect of a particular server-client rendering environment in the above examples, the light texture data enhancement module 310 can, in alternative examples, be treated as a plug-and-play module that is applicable to any system utilizing similar light texture data and is not limited to cases where light information is generated by path tracing algorithms. For example, light texture data enhancement module 310 can also be applied to systems where light texture data is generated with a pure AI model (e.g. AI based neural rendering for bins), as well as a hybrid system consisting of a ray tracing component that generates a low-quality/-resolution light texture, and an AI component that enhances the light texture (AI based denoising, anti-aliasing within bins, AI based super-sampling within bins, AI-based interpolation for new bins, and etc.).

Although the color measurements are described above as comprising light texture data in the form of RGB values, in other examples the light texture data could take the form of 3D light information, including for example neural radiance field (NeRF) data or point cloud data, with suitable amendment to the AI models used to perform enhancement.

Figure 15:
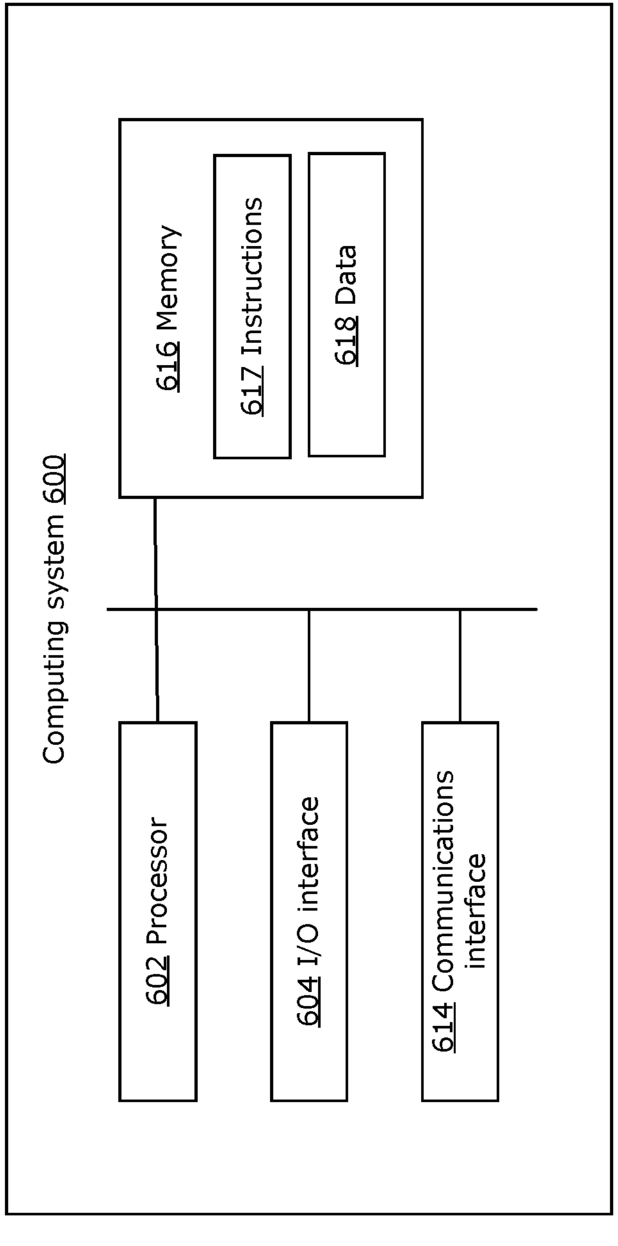
FIG. 15 is a block diagram illustrating an example hardware structure of a computing system that may be used for implementing methods to process a 3D scene model, in accordance with examples of the present disclosure.

FIG. 15 is a block diagram illustrating an example hardware structure of a computing system 600 that is suitable for implementing embodiments described herein, such as instances of the server 102 or the client device 104 in the rendering system 100. Examples of the present disclosure may be implemented in other computing systems, which may include components different from those discussed below.

Although FIG. 15 shows a single instance of each component, there may be multiple instances of each component in the computing system 600. Further, although the computing system 600 is illustrated as a single block, the computing system 600 may be a single physical machine or device (e.g., implemented as a single computing device, such as a single workstation, single end user device, single server, etc.), or may comprise a plurality of physical machines or devices (e.g., implemented as a cluster of servers or a cluster of client devices). For example, the computing system 600 may represent a group of servers or cloud computing platform using the first tracing algorithm to calculate the one or more parameters (e.g., a calculated color, a visibility probability, and a local frame) of captured incoming lights from a plurality of directions for each cluster in an edited 3D scene.

The computing system 600 includes one or more processors 602, such as a central processing unit, a microprocessor, a digital signal processor, an application-specific integrated circuit (ASIC), a field-programmable gate array (FPGA), a dedicated logic circuitry, a dedicated artificial intelligence processor unit, a graphics processing unit (GPU), or combinations thereof.

The computing system 600 may include an input/output (I/O) interface 604 to enable interaction with the system through I/O devices. The computing system 600 may include a communications interface 614 for wired or wireless communication with other computing systems via one or more intermediate networks. The communications interface 614 may include wired link interfaces (e.g., Ethernet cable) and/or wireless link interfaces (e.g., one or more antennas) for intra-network and/or inter-network communications.

The computing system 600 may include one or more memories 616 (collectively referred to as "memory 616"), which may include a volatile and non-volatile memories. Non-transitory memory 616 may store instructions 617 for execution by the one or more processors 602, such as to carry out examples described in the present disclosure. For example, the memory 616 may store instructions for implementing any of the methods disclosed herein. The memory 616 may include other software instructions, such as for implementing an operating system (OS) and other applications/functions.

The memory 616 may also store other data 618, information, rules, policies, and machine-executable instructions described herein.

In some examples, instructions for performing the methods described herein may be stored on non-transitory computer readable media.

It should be noted that noted that, although the present disclosure applies static scenes with static light sources, this is not intended to be limiting. In some examples, dynamic scenes and dynamic light sources may be applied in other suitable scenarios.

The present disclosure provides certain example algorithms and calculations for implementing examples of the disclosed methods and systems. However, the present disclosure is not bound by any particular algorithm or calculation. Although the present disclosure describes methods and processes with steps in a certain order, one or more steps of the methods and processes may be omitted or altered as appropriate. One or more steps may take place in an order other than that in which they are described, as appropriate.

A person of ordinary skill in the art may be aware that, in combination with the examples described in the embodiments disclosed in this disclosure, units and algorithm steps may be implemented by electronic hardware or a combination of computer software and electronic hardware. Whether the functions are performed by hardware or software depends on particular applications and design constraint conditions of the technical solutions. A person skilled in the art may use different methods to implement the described functions for each particular application, but it should not be considered that the implementation goes beyond the scope of this disclosure.

It may be clearly understood by a person skilled in the art that, for the purpose of convenient and brief description, for a detailed working process of the foregoing system, apparatus, and unit, refer to a corresponding process in the foregoing method embodiments, and details are not described herein again.

It should be understood that the disclosed systems and methods may be implemented in other manners. The units described as separate parts may or may not be physically separate, and parts displayed as units may or may not be physical units, may be located in one position, or may be distributed on a plurality of network units. Some or all of the units may be selected according to actual requirements to achieve the objectives of the solutions of the embodiments. In addition, functional units in the embodiments of this application may be integrated into one processing unit, or each of the units may exist alone physically, or two or more units are integrated into one unit.

When the functions are implemented in the form of a software functional unit and sold or used as an independent product, the functions may be stored in a computer-readable storage medium. Based on such an understanding, the technical solutions of this disclosure essentially, or the part contributing to the prior art, or some of the technical solutions may be implemented in a form of a software product. The software product is stored in a storage medium, and includes several instructions for instructing a computer device (which may be a personal computer, a server, or a network device) to perform all or some of the steps of the methods described in the embodiments of this application. The foregoing storage medium includes any medium that can store program code, such as a universal serial bus (USB) flash drive, a removable hard disk, a read-only memory (ROM), a random access memory (RAM), a magnetic disk, or an optical disc, among others.

As used herein, statements that a second item (e.g., a signal, value, scalar, vector, matrix, calculation, or bit sequence) is "based on" a first item can mean that characteristics of the second item are affected or determined at least in part by characteristics of the first item. The first item can be considered an input to an operation or calculation, or a series of operations or calculations that produces the second item as an output that is not independent from the first item. Where possible, any terms expressed in the singular form herein are meant to also include the plural form and vice versa, unless explicitly stated otherwise. In the present disclosure, use of the term "a," "an", or "the" is intended to include the plural forms as well, unless the context clearly indicates otherwise. Also, the term "includes," "including," "comprises," "comprising," "have," or "having" when used in this disclosure specifies the presence of the stated elements, but do not preclude the presence or addition of other elements. As used here, the term "tensor" can mean a data structure that includes a set of discrete values where the order of the values in the data structure has meaning. Vectors and matrices are examples of tensors.

The foregoing descriptions are merely specific implementations of this application, but are not intended to limit the protection scope of this disclosure. Any variation or replacement readily figured out by a person skilled in the art within the technical scope disclosed in this disclosure shall fall within the protection scope of this disclosure.

The invention claimed is:

1. A computer implemented method for processing a first light data structure that includes light texture data that specifies, for each of plurality of directions for each of a plurality of respective surface regions corresponding to a scene, respective light measurements, comprising:

generating the first light data structure, including defining, for each of the plurality of respective surface regions, a respective local reference frame and a bin structure, the bin structure discretizing the local reference frame into a set of bins, each bin corresponding to a respective range of light directions that intersect the respective surface region, the first light data structure comprises a respective surface region light texture tensor for each of the respective surface regions;

applying a trained artificial intelligence (AI) model to the first light data structure to generate an enhanced light data structure that specifies, for each of the plurality of directions for each of the plurality of respective surface regions corresponding to the scene, respective enhanced light measurements; and storing an enhanced scene model that includes the enhanced light data structure together with geometric data that maps the enhanced light measurements within the enhanced light data structure to the plurality of respective surface regions.

2. The method of claim 1 wherein:

the first light data structure includes visibility probability data that specifies, for each of the plurality of respective surface regions corresponding to the scene, respective visibility probability values.

3. The method of claim 2 wherein:

the first light data structure comprises, for each of the plurality of directions, a respective direction specific first light texture map specifying the respective light measurements for the plurality of respective surface regions for the direction;

the visibility probability data is arranged as a visibility map having the same resolution as the first light texture maps; and the enhanced light data structure comprises, for each of the plurality of directions, a respective direction specific enhanced light texture map specifying the respective enhanced light measurements for the plurality of respective surface regions for the direction.

4. The method of claim 3 wherein the direction specific first light texture maps, the visibility map and the direction specific enhanced light texture maps are each formatted as respective two dimensional image files, and the geometric data maps respective pixel locations within the two dimensional image files to the respective surface regions of the plurality of respective surface regions.

5. The method of claim 4 wherein the AI model comprises at least one of a convolutional auto encoder, a vision transformer, or a recurrent neural network.

6. The method of claim 1 wherein the AI model comprises at least one or more of: a denoiser, a super-sampler; or an anti-aliasing model.

7. The method of claim 1 wherein:

the enhanced light texture data structure comprises a respective enhanced surface region light texture tensor for each of the respective surface regions.

8. The method of claim 1 wherein the respective light measurements each represent a gathered RGB color value light color measurement.

9. The method of claim 1 wherein the enhanced scene model conforms to a graphics language transmission format (gITF).

10. The method of claim 1 wherein, for each of the plurality of directions for each of the plurality of respective surface regions, the light measurements represent light data for a respective range of light directions that intersect the respective surface region.

11. The method of claim 1 comprising wherein generating the first light data structure includes: including:

computing, for each respective surface region, a respective color measurement for each bin of the bin structure, the respective color measurement for each bin being based on a path trace of one or more light ray samples that fall within the respective range of light directions corresponding to the bin, wherein the respective color measurements are used as the respective light measurements;

assembling the first light data structure that indicates the respective local reference frames, bin structures, and respective light measurements for the respective surface regions; and storing the first light data structure.

12. The method of claim 1 comprising sending the enhanced scene model through a network to a remote rendering device.

13. The method of claim 12 comprising repeatedly performing the applying, storing and sending in order to support real-time rendering of series of scenes at the rendering device wherein the applying, storying, and sending are performed at a cloud computing platform that is more computationally powerful than the rendering device.

14. The method of claim 13 comprising:

at the rendering device:

obtaining the enhanced scene model;

rendering a scene image for the scene model based on an input view direction, wherein pixel colors in the rendered scene image are determined based on the light measurements included in the enhanced scene model.

15. A system comprising one or more processors and one or more non-transitory memories that store executable instructions for the one or more processors, wherein the executable instructions, when executed by the one or more processors, configure the system to perform a method of processing a first light data structure that includes light texture data that specifies, for each of plurality of directions for each of a plurality of respective surface regions corresponding to a scene, respective light measurements, comprising:

generating the first light data structure, including defining, for each of the plurality of respective surface regions, a respective local reference frame and a bin structure, the bin structure discretizing the local reference frame into a set of bins, each bin corresponding to a respective range of light directions that intersect the respective surface region, the first light data structure comprises a respective surface region light texture tensor for each of the respective surface regions;

applying a trained artificial intelligence (AI) model to the first light data structure to generate an enhanced light data structure that specifies, for each of the plurality of directions for each of the plurality of respective surface regions corresponding to the scene, respective enhanced light measurements; and storing an enhanced scene model that includes the enhanced light data structure together with geometric data that maps the enhanced light measurements within the enhanced light data structure to the plurality of respective surface regions.

16. The system of claim 15 wherein:

the first light data structure includes visibility probability data that specifies, for each of the plurality of respective surface regions corresponding to the scene, respective visibility probability values.

17. The system of claim 16 wherein:

the first light data structure comprises, for each of the plurality of directions, a respective direction specific first light texture map specifying the respective light measurements for the plurality of respective surface regions for the direction;

the visibility probability data is arranged as a visibility map having the same resolution as the first light texture maps; and the enhanced light data structure comprises, for each of the plurality of directions, a respective direction specific enhanced light texture map specifying the respective enhanced light measurements for the plurality of respective surface regions for the direction.

18. The system of claim 17 wherein the direction specific first light texture maps, the visibility map and the direction specific enhanced light texture maps are each formatted as respective two dimensional image files, and the geometric data maps respective pixel locations within the two dimensional image files to the respective surface regions of the respective plurality of surface regions.

19. The system of claim 14 wherein the method comprises sending the enhanced scene model through a network to a remote rendering device, and the applying, storing and sending are repeated to support real-time rendering of series of scenes at the rendering device wherein the applying, storying, and sending are performed at a cloud computing platform that is more computationally powerful than the rendering device.

20. A non-transitory computer readable medium storing computer executable instructions that when executed by one or more processors of a computer system, configure the computer system to perform a method of processing a first light data structure that includes light texture data that specifies, for each of plurality of directions for each of a plurality of respective surface regions corresponding to a scene, respective light measurements, comprising:

generating the first light data structure, including defining, for each of the plurality of respective surface regions, a respective local reference frame and a bin structure, the bin structure discretizing the local reference frame into a set of bins, each bin corresponding to a respective range of light directions that intersect the respective surface region, the first light data structure comprises a respective surface region light texture tensor for each of the respective surface regions;

applying a trained artificial intelligence (AI) model to the first light data structure to generate an enhanced light data structure that specifies, for each of the plurality of directions for each of the plurality of respective surface regions corresponding to the scene, respective enhanced light measurements; and storing an enhanced scene model that includes the enhanced light data structure together with geometric data that maps the enhanced light measurements within the enhanced light data structure to the plurality of respective surface regions.

* * * * *